(12) United States Patent
Mustafa

(10) Patent No.: US 8,235,150 B2
(45) Date of Patent: *Aug. 7, 2012

(54) PNEUMATIC HYBRID TURBO TRANSMISSION

(76) Inventor: Rez Mustafa, Covina, CA (US)

(*) Notice: Subject to any disclaimer, the term of this patent is extended or adjusted under 35 U.S.C. 154(b) by 611 days.

This patent is subject to a terminal disclaimer.

(21) Appl. No.: 12/481,159

(22) Filed: Jun. 9, 2009

(65) Prior Publication Data

US 2009/0313990 A1 Dec. 24, 2009

Related U.S. Application Data

(63) Continuation-in-part of application No. 12/145,469, filed on Jun. 24, 2008, now Pat. No. 7,810,322, and a continuation-in-part of application No. 12/269,261, filed on Nov. 12, 2008, now Pat. No. 8,087,487.

(51) Int. Cl.
| | |
|---|---|
| B60K 16/00 | (2006.01) |
| B60L 11/16 | (2006.01) |
| F01D 1/00 | (2006.01) |
| F03D 3/02 | (2006.01) |
| F01B 13/06 | (2006.01) |

(52) U.S. Cl. ........... 180/2.2; 180/165; 180/301; 415/62; 416/201 R; 416/175; 123/561; 123/243; 123/44 R

(58) Field of Classification Search .............. 180/165, 180/2.1, 2.2, 301, 302; 415/61, 62; 416/201 R, 416/175; 60/598, 289; 123/559.1, 561, 241, 123/243, 44 R, 44 C See application file for complete search history.

(56) References Cited

U.S. PATENT DOCUMENTS

| | | | |
|---|---|---|---|
| 385,226 A | 6/1888 | Barden | |
| 820,444 A * | 5/1906 | Southworth | 180/242 |
| 1,045,505 A | 11/1912 | Brauer | |
| 1,122,972 A | 12/1914 | Maye | |
| 1,374,164 A | 4/1921 | Nordwick | |
| 1,528,164 A | 3/1925 | Nordwick | |
| 1,654,378 A | 12/1927 | Marchetti | |
| 2,168,862 A | 8/1939 | De Lavaud | |
| 2,371,821 A * | 3/1945 | Havis | 416/207 |
| 2,380,734 A | 7/1945 | Eastin | |
| 2,469,085 A | 5/1949 | Sheppard | |
| 2,581,596 A * | 1/1952 | Nims | 180/65.245 |
| 2,671,543 A | 3/1954 | Bosh | |
| 2,742,760 A * | 4/1956 | Hodge | 60/792 |
| 2,812,670 A | 11/1957 | Winther | |
| 2,884,234 A * | 4/1959 | Franklin et al. | 366/314 |
| 2,890,600 A | 6/1959 | Smirl et al. | |
| 2,964,976 A | 12/1960 | Kelly | |
| 3,250,149 A | 5/1966 | Jandasek | |

(Continued)

*Primary Examiner* — John R Olszewski

(74) *Attorney, Agent, or Firm* — Kirk A. Buhler; Buhler & Associates

(57) ABSTRACT

A pneumatic hybrid turbo transmission for reduced energy consumption is disclosed. A pneumatic hybrid turbo transmission configured as a multi-purpose unit (MPU). The MPU recovers energy from the cooling system, exhaust system, ram pressure and the breaking system. The MPU unit is an automatic transmission, supercharger, air compressor for other uses, and starter for the engine using a multi-purpose unit that will eliminate the need for a torque converter or clutch, flywheel, catalytic converter, starter and supercharger. The MPU reduces pollution to near zero and reduces the aerodynamic drag coefficient on the vehicle. The MPU uses two or more in-line compressors to transfer power from the power source, such as an internal combustion engine (ICE) to a turbine or multi-stage turbine that acts as an automatic transmission. The pneumatic hybrid turbo transmission system uses plug-in power as a second source of power.

22 Claims, 24 Drawing Sheets

U.S. PATENT DOCUMENTS

| | | |
|---|---|---|
| 3,517,652 A | 6/1970 | Albertson |
| 3,528,321 A | 9/1970 | Harmon et al. |
| 3,556,239 A * | 1/1971 | Spahn .................. 180/65.25 |
| 3,557,635 A | 1/1971 | Tuck |
| 3,578,117 A | 5/1971 | Ahlen |
| 3,584,610 A | 6/1971 | Porter |
| 4,003,351 A | 1/1977 | Gunther |
| 4,013,048 A | 3/1977 | Reitz |
| 4,043,126 A * | 8/1977 | Santos ....................... 60/407 |
| 4,100,823 A | 7/1978 | Krist |
| 4,254,843 A | 3/1981 | Han et al. |
| 4,274,253 A | 6/1981 | Bolliger et al. |
| 4,314,160 A | 2/1982 | Boodman et al. |
| 4,391,096 A | 7/1983 | Polzer et al. |
| 4,459,945 A | 7/1984 | Chatfield |
| 4,480,599 A | 11/1984 | Allais |
| 4,545,336 A | 10/1985 | Waide |
| 4,578,955 A | 4/1986 | Medina |
| 4,624,110 A * | 11/1986 | Levites ........................ 60/670 |
| 4,969,332 A | 11/1990 | Nancarrow et al. |
| 5,088,357 A | 2/1992 | Kamada et al. |
| 5,296,746 A | 3/1994 | Burkhart |
| 5,584,355 A | 12/1996 | Burns |
| 5,680,032 A | 10/1997 | Pena |
| 6,373,145 B1 | 4/2002 | Hamrick |
| 6,378,287 B2 * | 4/2002 | Griffiths ...................... 60/39.17 |
| 6,711,896 B1 | 3/2004 | Johnson |
| 6,877,593 B2 | 4/2005 | Johnson |
| 6,922,997 B1 | 8/2005 | Larson et al. |
| 6,976,467 B2 | 12/2005 | Fantuzzi |
| 7,121,236 B2 | 10/2006 | Scuderi |
| 7,322,193 B2 | 1/2008 | Bering et al. |
| 8,087,885 B2 * | 1/2012 | Suciu et al. ................. 415/199.4 |
| 2001/0017122 A1 | 8/2001 | Fantuzzi |
| 2006/0101800 A1 | 5/2006 | Rom |
| 2007/0113803 A1 | 5/2007 | Froloff et al. |
| 2007/0227801 A1 | 10/2007 | Loeffler |
| 2008/0121196 A1 | 5/2008 | Fantuzzi |

* cited by examiner

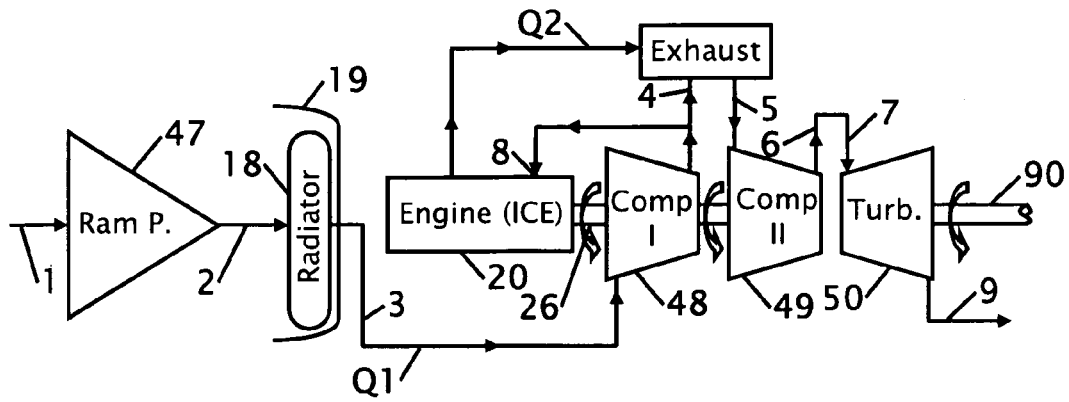
FIG. 1
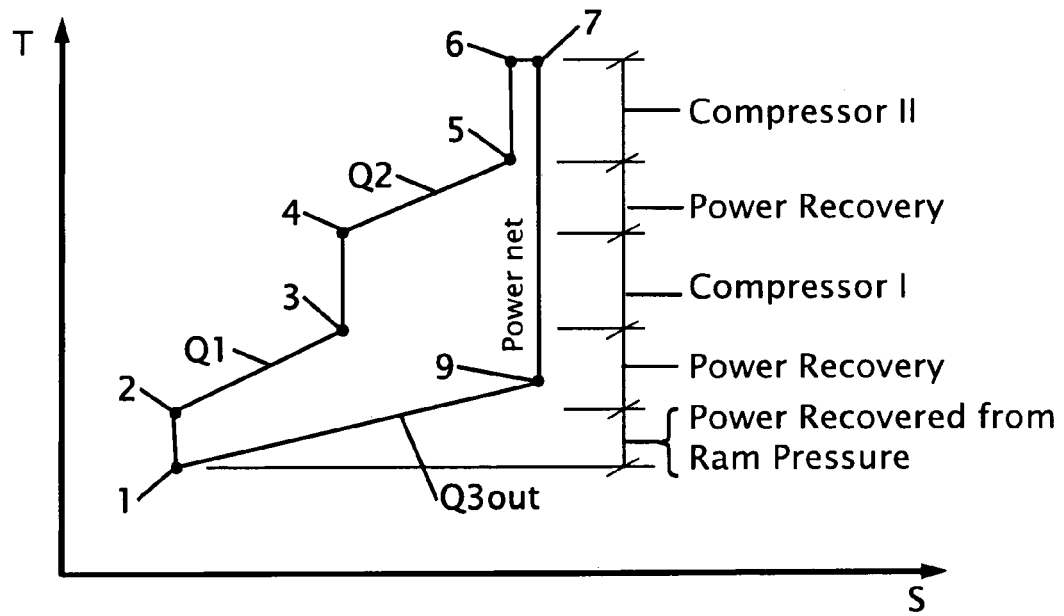
FIG. 2  T-S Diagram

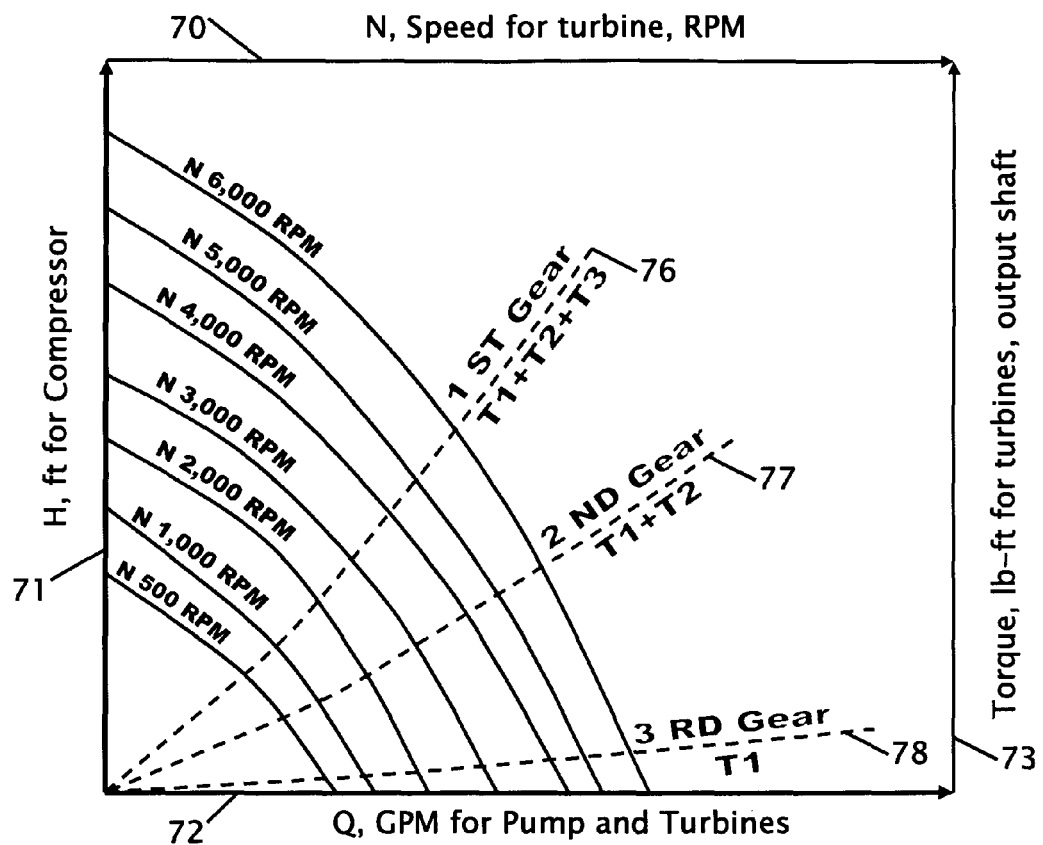
FIG. 16
 System Curve for Pump at different rotational speeds
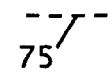 System Curve for Turbines
T: Indicates Turbine number System Curve for Pump at different rotational speeds
System Curve for Turbines T: Indicates Turbine number

PNEUMATIC HYBRID TURBO TRANSMISSION

CROSS REFERENCE TO RELATED APPLICATION

This application is a continuation-in-part of applicant's co-pending application Ser. No. 12/269,261 filed Nov. 12, 2008 and PCT/US09/32118 filed Jan. 27, 2009 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in energy consumption in a vehicle.

The invention is multi-purpose unit (MPU) for energy recovery from the cooling systems, exhaust system, ram pressure and breaking system.

2. Description of Related Art including information disclosed under 37 CFR 1.97 and 1.98

Most vehicles use 24% of their energy to drive the vehicle 24% for the cooling system, 33% for exhaust gas and the remainder of the energy is used for heat radiation, engine friction and other losses.

The MPU recovers some of the energy from the cooling system by capturing the ram pressure through the radiation and using the captured energy in the MPU.

The MPU uses energy recovered from the exhaust gas by sending the exhaust gas back into the MPU and using it. The exhaust gas that is being discharged from the cylinder has a high pressure and high temperature. By sending the exhaust back to the MPU the MPU can recover some of the heat and the pressure and convert it into power.

The MCU can use the energy recovered from the breaking system.

The MPU changes the concept of a vehicle design by using the ram pressure as useful pressure rather than negative pressure on the vehicle. The frontal area of the vehicle is enlarged in front of the radiator to let more air enter into the unit and reduce the drag coefficient. This change results in a new concept of an aerodynamic vehicle.

The MPU unit will reduce the pollution significantly by mixing the exhaust gas with fresh air from the air ram and under high temperature and high pressure.

Elimination of the catalytic converter will further reduce cost and energy that is lost from passing exhaust gas through the catalytic converter.

A first storage tank is used for the engine as a supercharger and to start the engine. A second storage tank is used for energy storage from the braking system and from a plug-in power source.

The second storage tank is usable as a compressed air supply to supply high pressure air and for other uses such as but not limited to the suspension system of the vehicle, construction tools and for the braking system.

The multi-purpose unit (MPU) has an automatic transmission that uses multi-stage turbines as shown and described in patent application Ser. Nos. 12/145,469, 12/421,286 and 12/269,261 by the same inventor.

The radial engine is shown and described in the inventor's prior patent application Ser. No. 12/238,203 by the same inventor.

Several products and patents have been. Exemplary examples of patents covering these products are disclosed herein.

U.S. Patent application number 2007/0113803 published on May 24, 2007 to Walt Froloff et al., discloses an Air-Hybrid and Utility Engine that uses compressed air in combination with air that is delivered from a conventional intake manifold. In this application the air is compressed with a compressor for direct injection in to cylinders as needed. While this application uses compressed air from a storage tank the air is not compressed from an air ram system where the forward velocity of the vehicle generates some of the compression of the air into the manifold.

U.S. Patent application number 2007/0227801 published Oct. 4, 2007 to John M. Loeffler discloses a Hydraulic Energy Recovery System with Dual-Powered Auxiliary Hydraulics. This patent uses stored hydraulic pressure to turn the wheels of the vehicle. A gas powered engine is used to compress the hydraulic fluid and to move the vehicle as needed to supplement the hydraulic power system. This type of system is most ideally used in vehicles that have an extensive amount of hydraulic systems, such as a garbage truck or earth moving equipment. While it provides one mode of vehicle propulsion it also does not use air from an air ram system or use regenerative braking to further conserve energy.

What is needed is a pneumatic hybrid turbo transmission that uses multiple different energy conservation methods including using the air entering the front of the car to compress air that is used in the intake manifold, hydraulic and pneumatic storage to store energy that is lost. The pending application provides a solution to conserve energy losses and reduce pollution.

BRIEF SUMMARY OF THE INVENTION

It is an object of the pneumatic hybrid turbo transmission to operate as a multi-purpose unit (MPU) is a second engine, supercharge, compressed air storage tank, air compressor, starter for the engine, catalytic converter and automatic transmission. The multi-purpose unit (MPU) reduces the pollution to near zero and further reduces the drag coefficient on the vehicle.

The multi-purpose unit has two or more in-line compressors that transfer the power from the power source, such as an internal combustion engine (ICE), to a turbine or multi-stage turbine to act as an automatic transmission.

The pneumatic hybrid turbo transmission system uses a plug-in or external power source as a second source of power.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 1 shows a block diagram of a first preferred embodiment of a pneumatic hybrid turbo-transmission.

FIG. 2 shows a T-S diagram of energy through the pneumatic hybrid turbo-transmission in the first preferred embodiment.

FIG. 16 Shows a system curve for a three speed Turbo-Transmission.

DETAILED DESCRIPTION OF THE INVENTION

Figure 3:
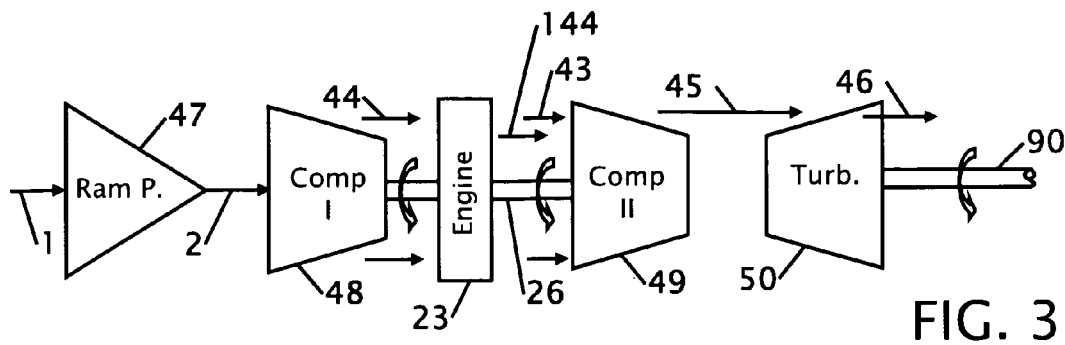
FIG. 3 shows a block diagram of a second preferred embodiment of a pneumatic hybrid turbo-transmission with a radial engine.

FIG. 1 shows a block diagram of a first preferred embodiment of a pneumatic hybrid turbo-transmission. FIG. 2 shows a T-S diagram of energy through the pneumatic hybrid turbo-transmission as shown in the block diagrams in FIG. 1. As a vehicle moves forward air enters into the front of a vehicle creating drag. In a preferred embodiment the air enters into the front of the vehicle 1. The ram pressure 47 is compressed as it enters the vehicle creating ram pressure 2. The ram pressure 2 passes through the radiator 18 of the vehicle where it is heated. Refer to the graph in FIG. 2 that shows the temperature rise on the vertical axis where the corresponding item numbers are shown with the temperature and work recovery.

The radiator 18 has a hood 19 that collects the air 3 after the radiator 18 where energy Q1 is recovered from the radiator 18. The air flow after the radiator 3 passes into compressor (I) 48. Compressor (I) 48 is powered by work unit or engine 20 turn 26 compressor (I) 48 that performs an initial compression of the air 3 from the radiator 18. A portion of the compressed air from compressor (I) is returned to the work unit to supercharge the engine 8 and the remainder of the compressed air from the compressor (I) 4 is mixed with the exhaust from the work unit 20 and passed into compressor (II) 49. The work unit 20 produces exhaust, and the heat and pressure from operation and the exhaust is recovered as work Q2 and mixed with some of the air from compressor (I) 4 and passed into compressor (II).

The mixed exhaust and compressed ram air 5 enters into compressor (II) 49 that is also powered by the work unit 20 where it is further compressed 6. The compressed air after compressor (II) 7 enters into turbine 50 that turns the output shaft 90 that moves the vehicle. The air after the turbine 9 is vented to the atmosphere.

Figure 4:
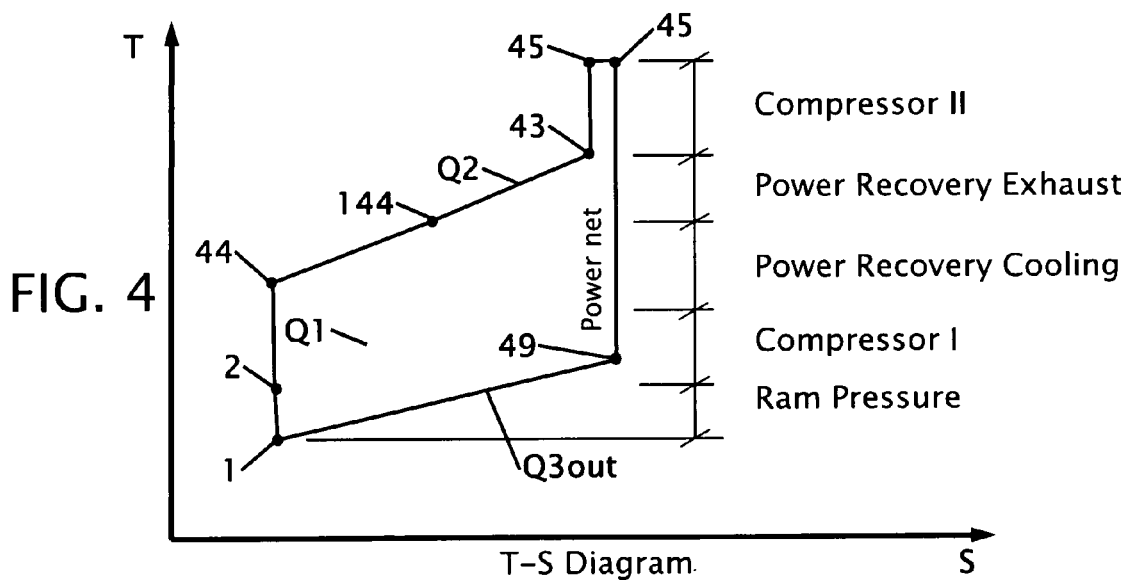
FIG. 4 shows a T-S diagram of energy through the pneumatic hybrid turbo-transmission in the second preferred embodiment.

FIG. 3 shows a block diagram of a second preferred embodiment of a pneumatic hybrid turbo-transmission using an air cooling radial configuration engine 23. FIG. 4 shows a T-S diagram of energy through the pneumatic hybrid turbo-transmission. As a vehicle moves forward air enters into the front of a vehicle creating drag. In a preferred embodiment the air enters into and air ram in the front of the vehicle 1. The ram pressure 47 is compressed as it enters the vehicle creating ram pressure 2. The ram pressure 2 passes through the compressor (I) 48 and then the compressed air 44 enters through air cooling system for radial engine 23. Output air 144 is mixed with exhaust air from the engine. The mixed air 43 enters compressor II 49.

The air 1 that enters the front of the vehicle. The engine 23 turns both compressor (I) 48 and compressor (II) 49 with a common input shaft 26. The gas or air 45 after compressor (II) 49 enters into turbine 50 that turns the output shaft 90 that moves the vehicle. The air after the turbine 50 is vented 46 to the atmosphere.

Figure 5:
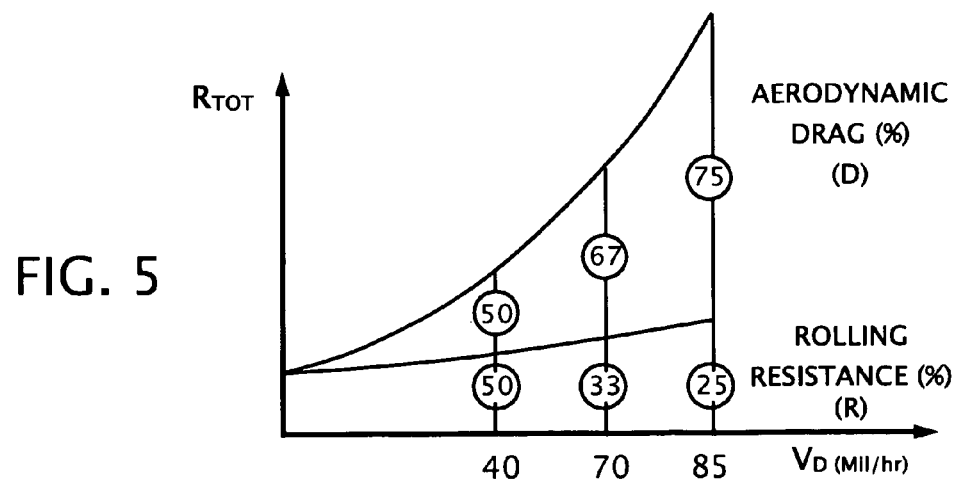
FIG. 5 shows a graph of the relationship between aerodynamic drag and rolling resistance over a speed range.

FIG. 5 shows a graph of the relationship between aerodynamic drag and rolling resistance over a speed range. In the preferred embodiment the rolling resistance is caused by the wheels rolling on the ground. The aerodynamic drag changes significantly depending upon the speed of the vehicle. Using the air ram pressure, this drag to produce useful work within the vehicle as opposed to causing an impact on the vehicle as aerodynamic drag.

In FIGS. 6-13, as a vehicle moved forward, air enters into the front of the vehicle as ram air. The ram pressure 2 passes through the radiator 18 of the vehicle where it is heated. A shroud 19 is located around the radiator 18 for capturing the heated ram air 3 and directs the heated air to the pneumatic hybrid turbo-engine 57. A work unit 20, such as a combustion engine turns with the input shaft 26, compressor (I) 48, the compressed and the heated ram air.

The majority of the compressed air after compressor (I) 48 is passed to a second compressor (II) 49. A portion of the compressed air 11 after compressor (I) 48 passes through a check valve 42 and into a first storage tank 16 having cooling fins. A valve 41 passes air from the first storage tank 16 where the compressed air 12 enters the work unit 20 (ICE) to turbocharge the work unit 20 (ICE). The valve 41 opens when the engine is turned on, in other conditions the valve is closed. Exhaust 10 from the work unit 20 is passed back into the pneumatic hybrid turbo-engine 57 between compressor (I) 48 and compressor (II) 49 where the fresh air and exhaust air is mixed.

FIGS. 6, 8, 10 and 12 show that the exhaust gas will be release into the atmosphere after the turbine 50, and will be a typical transmission 56 after the turbine 50. FIGS. 7, 9, 11 and 13 show that the exhaust gas will be released in tin to the atmosphere after the multi-stage turbine transmission is found in the inventor's prior application Ser. No. 12/145,469 and 12/421/286 that performs as a multi-stage transmission to turn the wheels of the vehicle.

Figure 6:
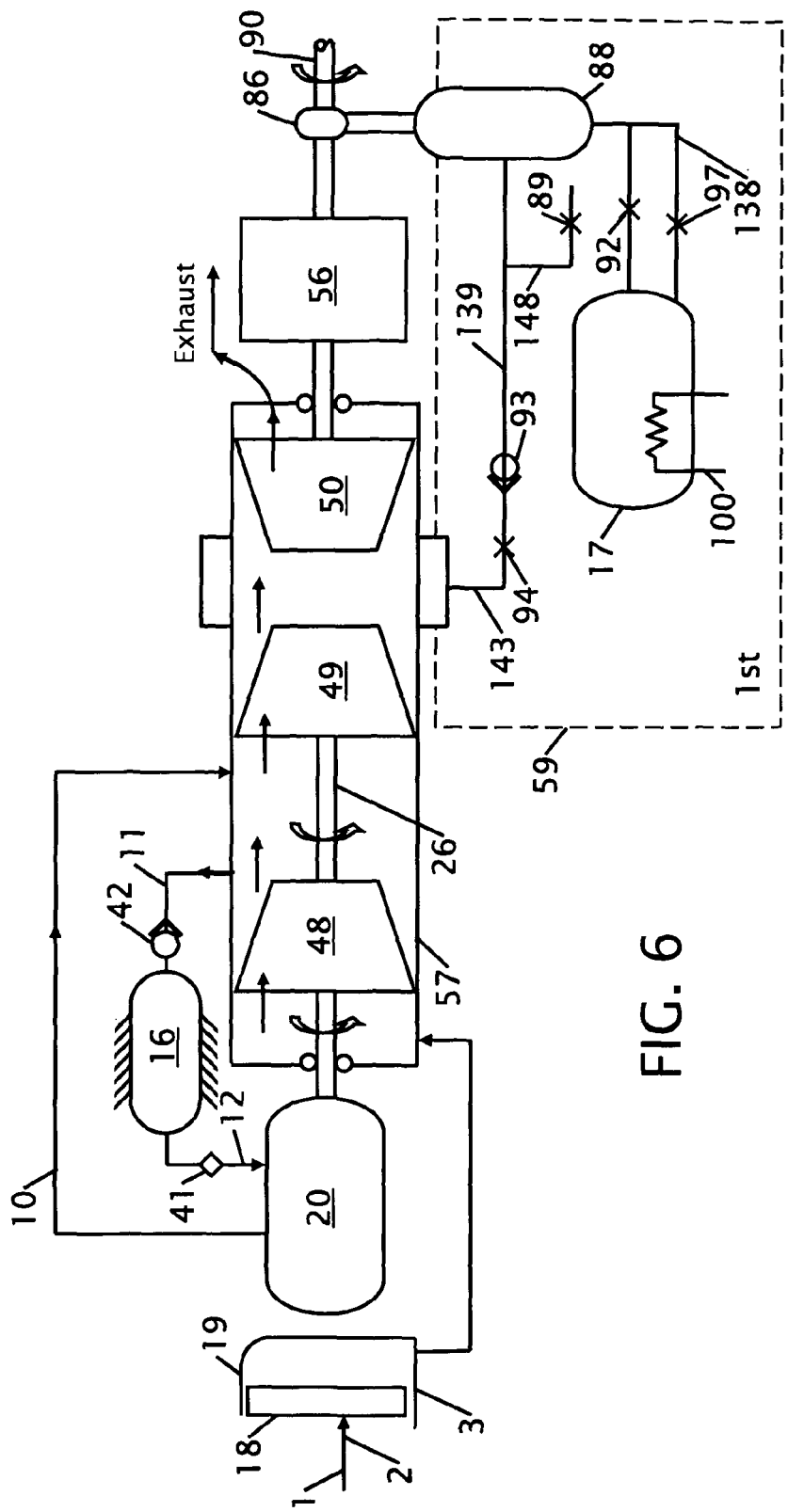
FIG. 6 shows a block diagram of third preferred embodiment of a pneumatic hybrid turbo-transmission with a compressor/turbo unit.
Figure 7:
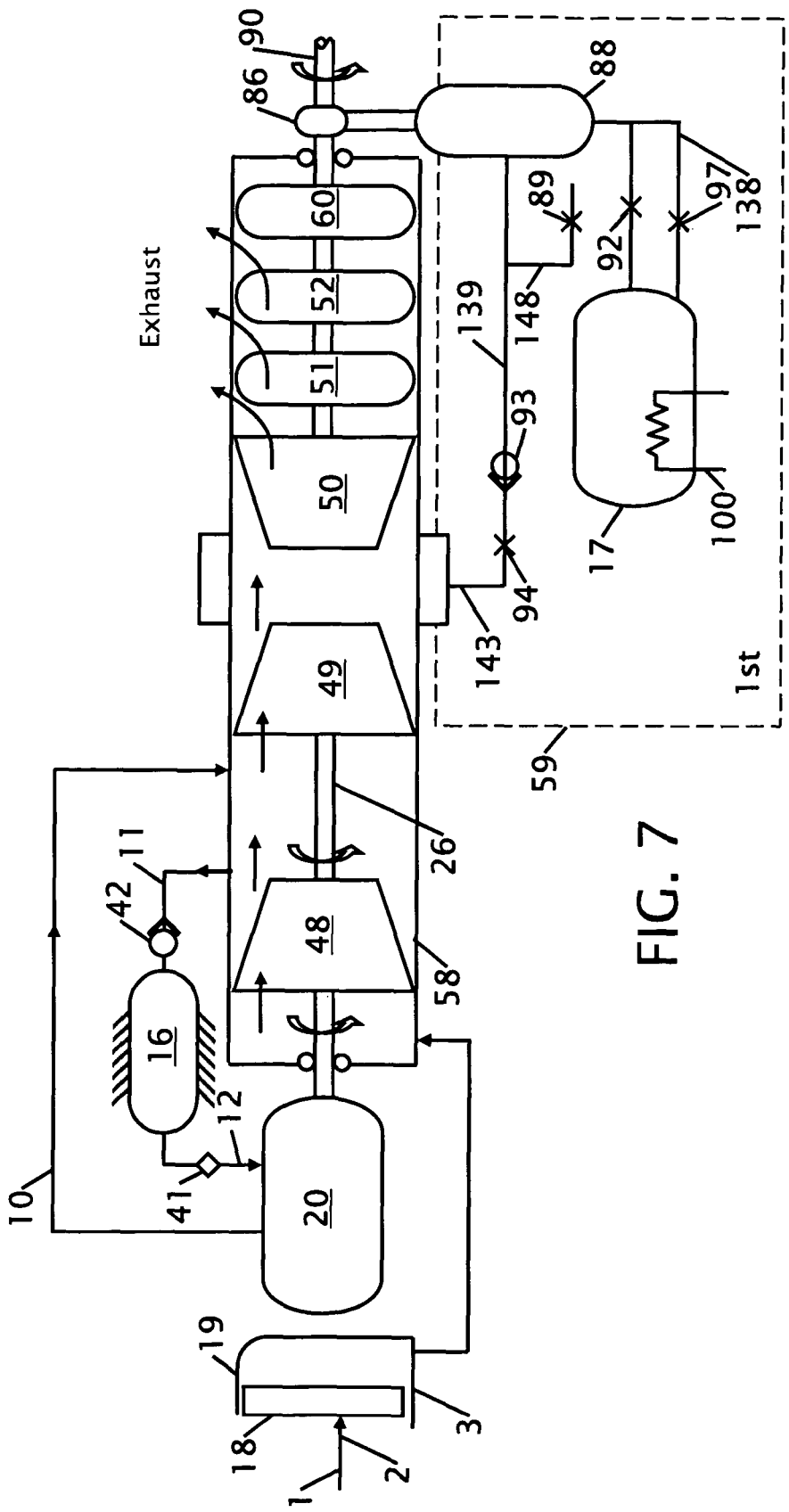
FIG. 7 shows a block diagram of fourth preferred embodiment of a pneumatic hybrid turbo-transmission with a compressor/turbo unit.

FIGS. 6 and 7 show a block diagram of third and forth preferred embodiment of a pneumatic hybrid turbo-transmission with a compressor/turbo unit used for energy recovery from the braking system 59 that includes a storage tank (II) 17 with a wire resistor 100 for using an external (Plug-in) power. A compressor/turbine unit 88 is connected with a planetary gear set 86 The unit 88 works as a compressor when using a foot operated brake when the valve 94 and 92 is opened and the valves 89 and 97 are closed. The air pressure from compressor (II) sent to compressor (III), unit 88 to compress the air again that is sent to storage tank (II). IN acceleration mode the valves 94 and 92 close and the valve 89 will open. The throttling valve 97 will be opened by the gas pedal or by the control unit of the vehicle. The unit 88 works as a turbine that uses the high pressure air from storage tank (II) 17 to produce rotational power to turn the output shaft 90.

Figure 8:
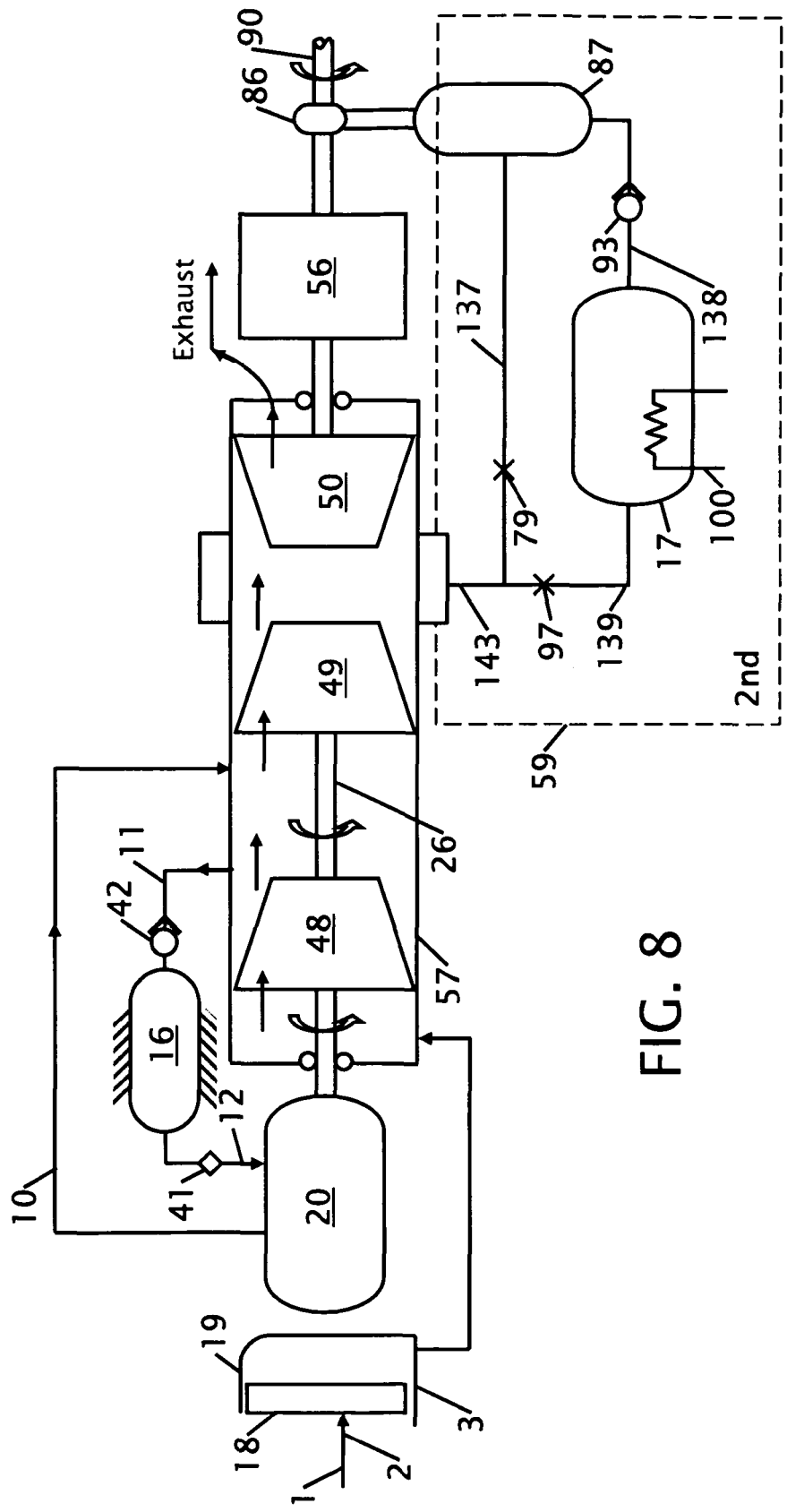
FIG. 8 shows a block diagram of fifth preferred embodiment of a pneumatic hybrid turbo-transmission with a compressor unit.
Figure 9:
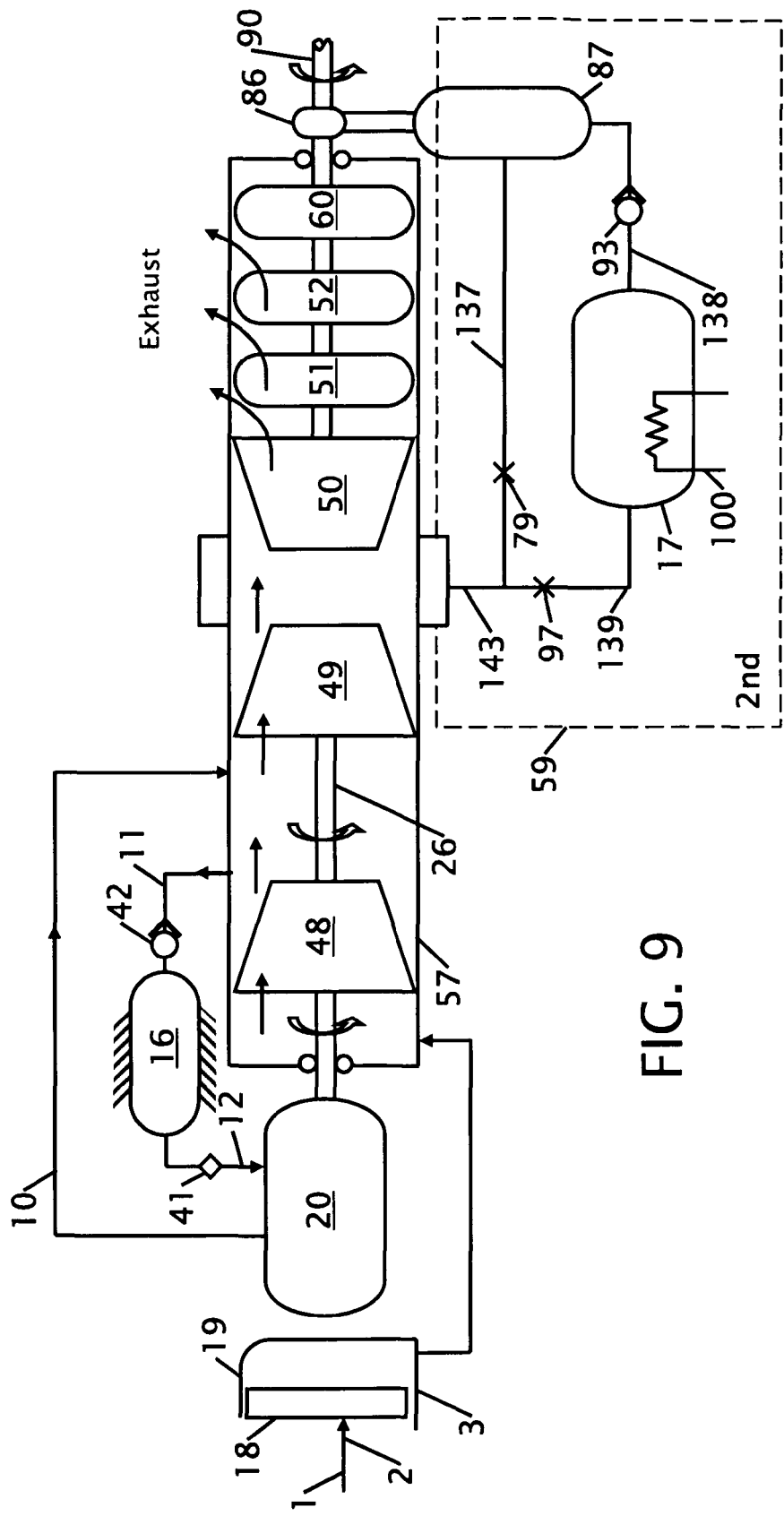
FIG. 9 shows a block diagram of sixth preferred embodiment of a pneumatic hybrid turbo-transmission with a compressor unit.

FIGS. 8 and 9 show the second preferred embodiment of the energy that is recovered from the braking system 59 that includes a storage tank (II) 17 with a resistance wire 100 for external plug-in power. A compressor unit (III) 87 is connected to the output shaft 90 with an engageable coupling 86. The engageable coupling 86 allows the compressor unit (III) 87 to operate when a user engages a brake pedal. Operation of the brake pedal opens valve 79 on air line 137 and valve 97 will close. The compressed air from after compressor (II) is sent to inlet compressor (III) 87 though pipe 137 then through valve 79 to the inlet of compressor unit (III) 87. Air flows from the outlet of compressor (III) 87 flows though check valve 93 in pipe 138 to storage tank (II) 17. The pressurized air from tank (II) 17 is sent back to turbine 50 for acceleration or to move the vehicle by opening the throttling valve 97 and closing the valve 79 and disengaging the compressor shaft from output shaft 86.

Figure 10:
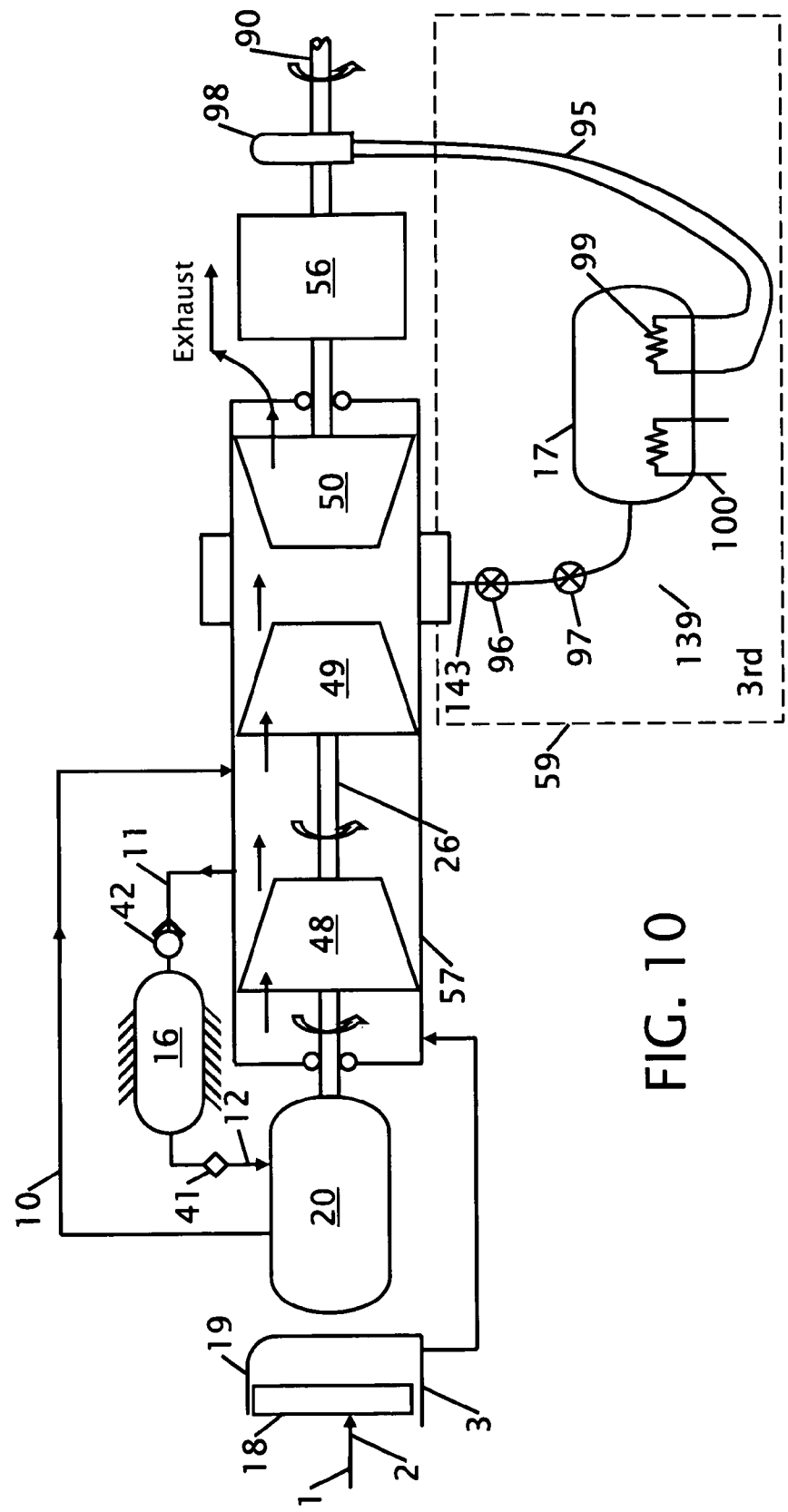
FIG. 10 shows a block diagram of seventh preferred embodiment of a pneumatic hybrid turbo-transmission with an electrical generator.
Figure 11:
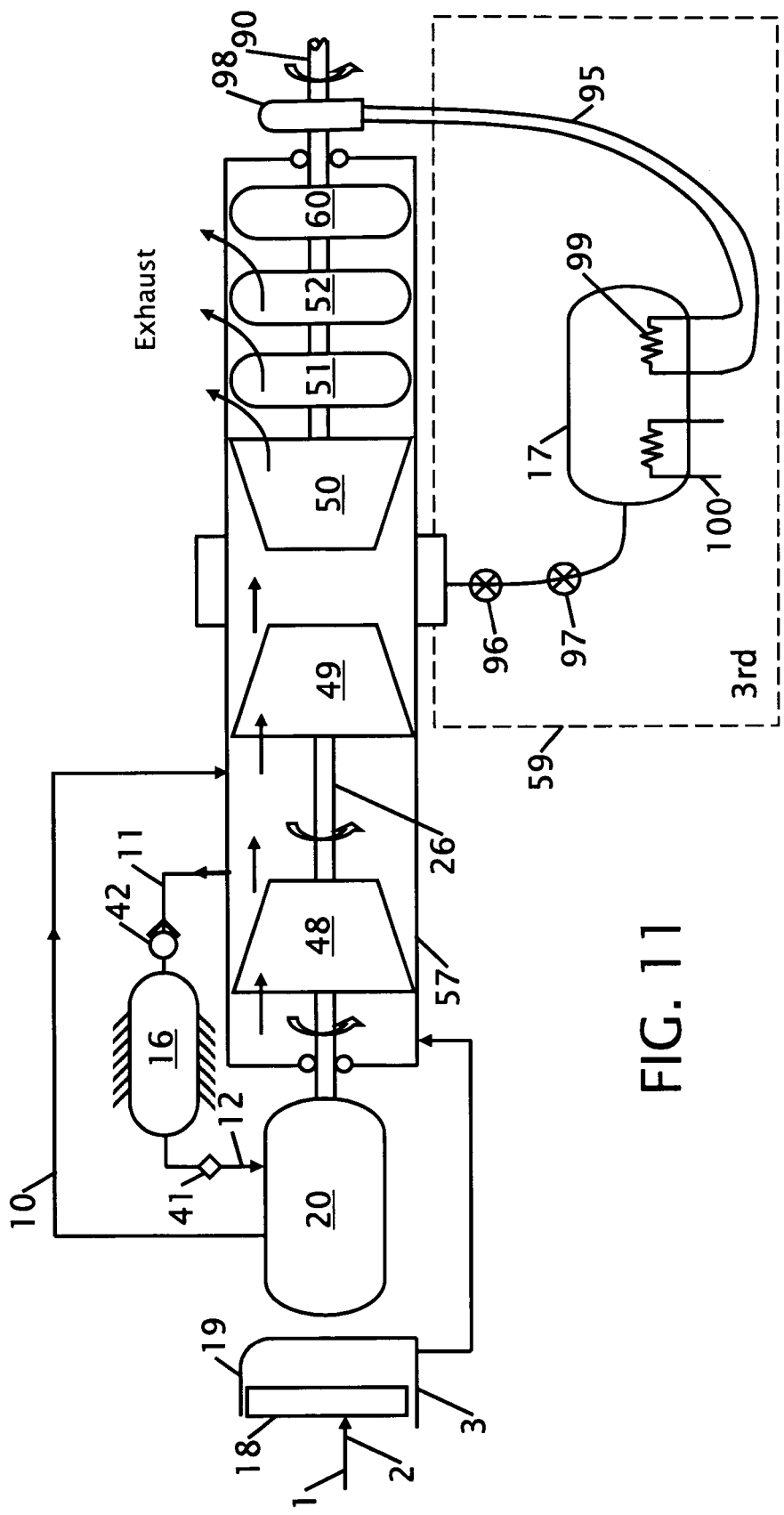
FIG. 11 shows a block diagram of eight preferred embodiment of a pneumatic hybrid turbo-transmission with an electrical generator.
Figure 12:
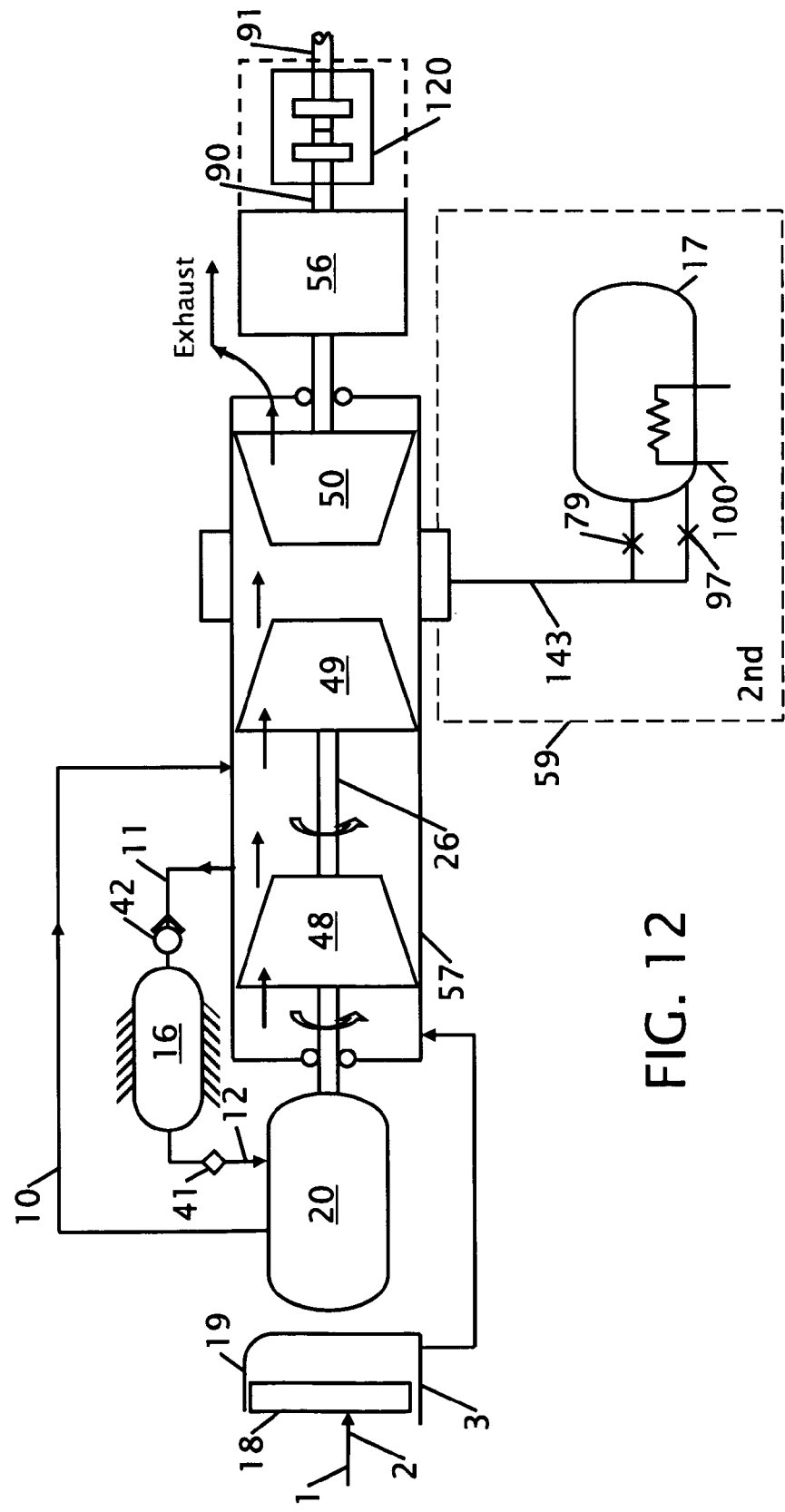
FIG. 12 shows a block diagram of a ninth preferred embodiment of a pneumatic hybrid turbo-transmission without an outside unit.
Figure 13:
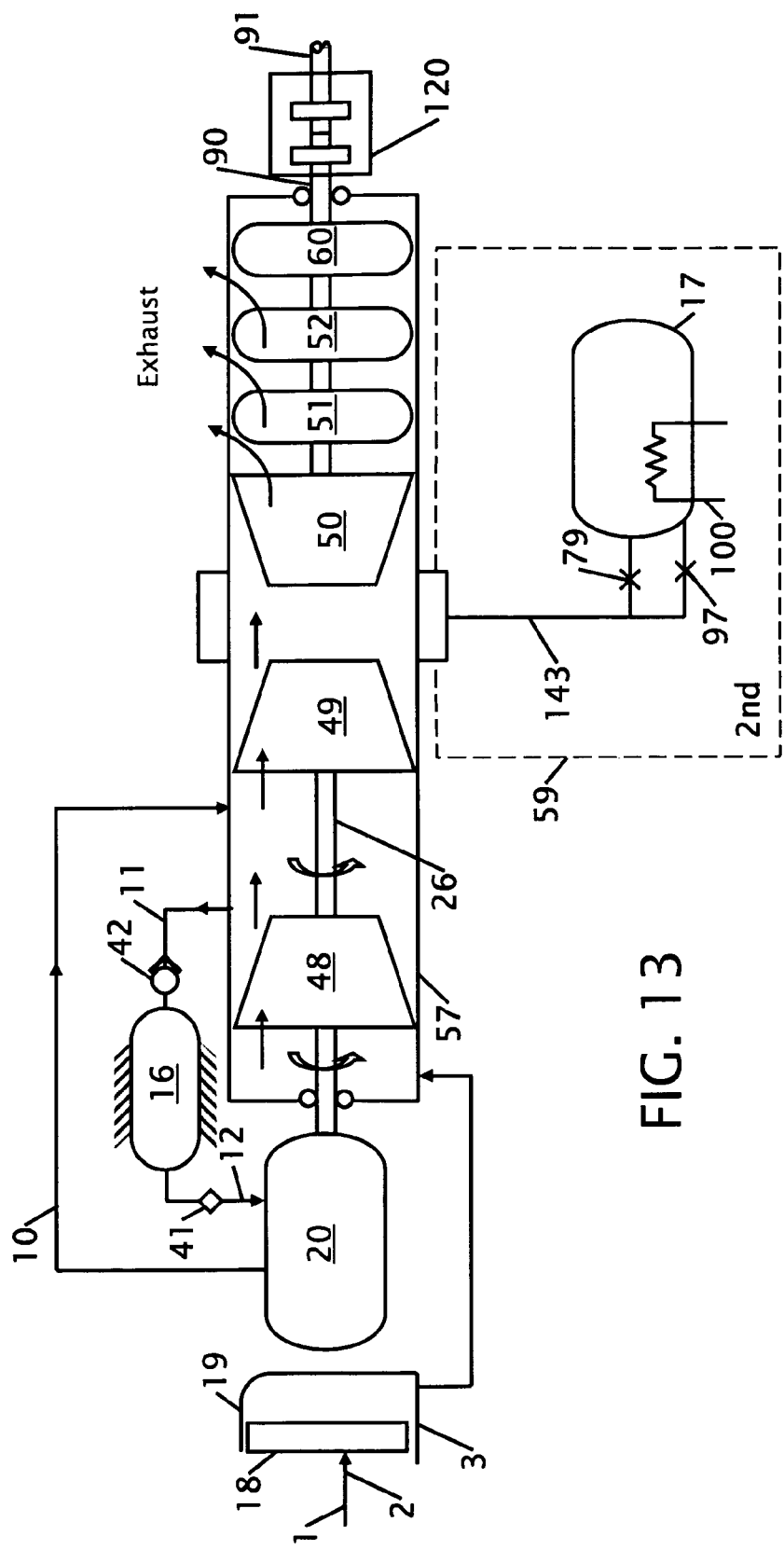
FIG. 13 shows a block diagram of a tenth preferred embodiment of a pneumatic hybrid turbo-transmission with an outside unit.
Figure 14:
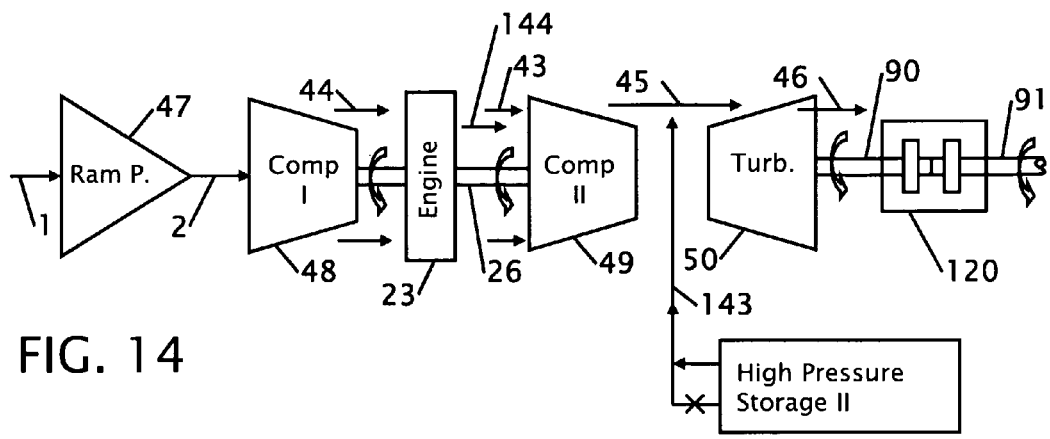
FIG. 14 shows a block diagram of a pneumatic hybrid-transmission with a radial engine and a high pressure storage under normal operation.
Figure 15:
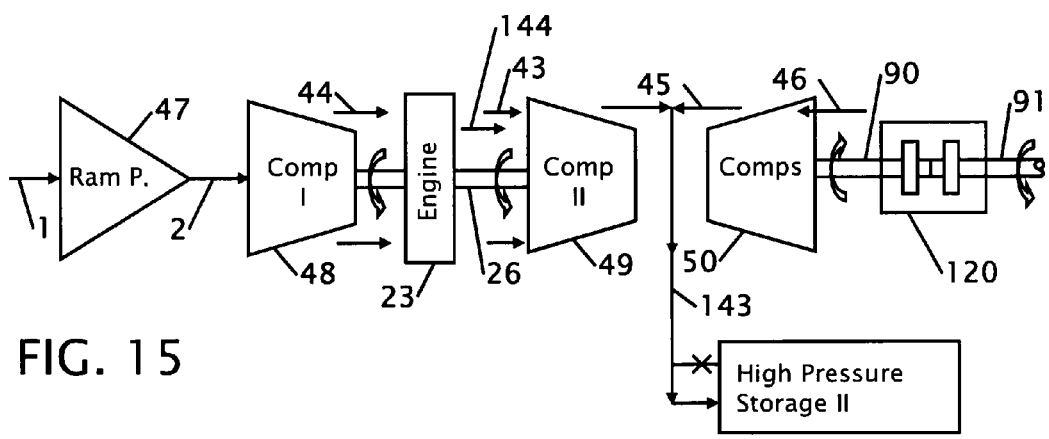
FIG. 15 shows a block diagram of a pneumatic hybrid turbo-transmission with a radial engine and a high pressure storage tank that is used during the operation of braking.
Figure 17:
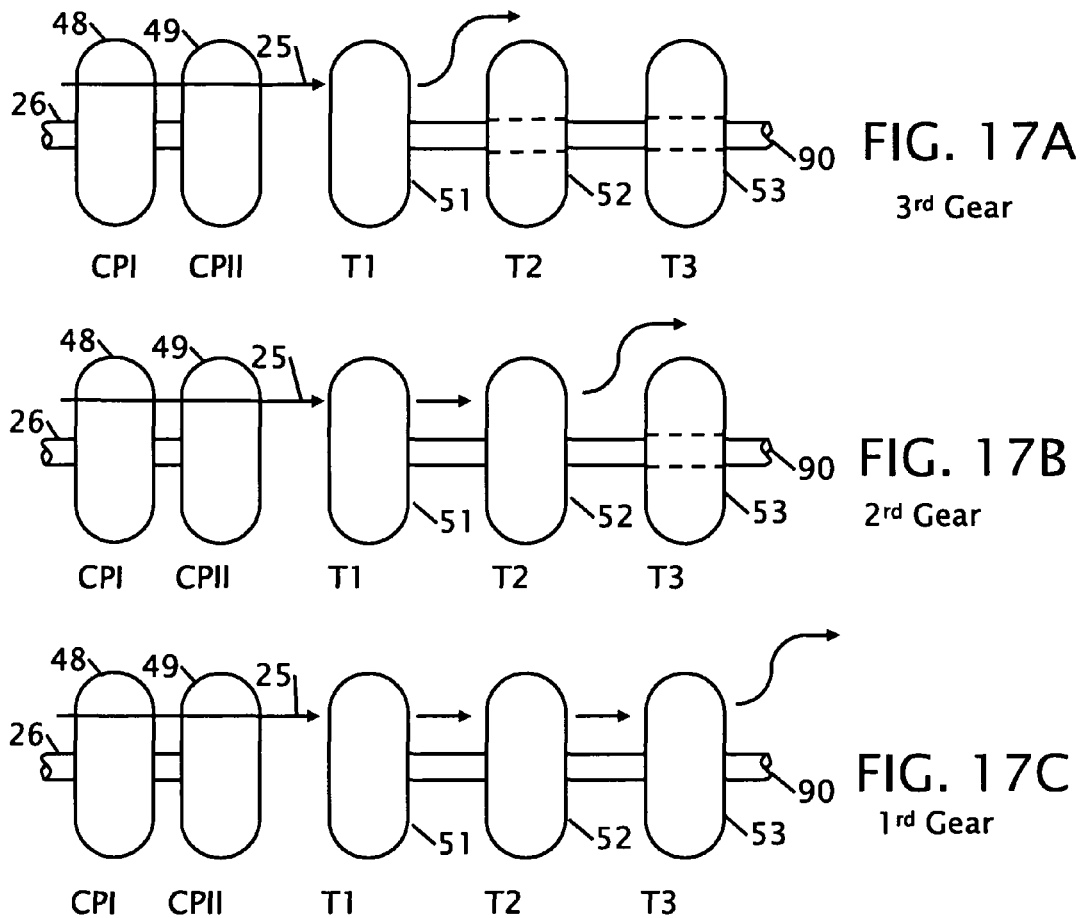
FIG. 17A-17D shows a three speed turbo-transmission and the fluid flow through each of the three speeds.

FIGS. 10 and 11 show the third preferred embodiment of the energy recovery from the braking system 59 including a storage tank (II) 17 with a wire resistor 100 for external plug-in power and wire resistor 99 from electrical generator 98. Electrical generator 98 operates from a foot pedal to generate power that is sent through wire(s) 95 to a wire resistor 99 inside the tank 17. The temperature and the pressure inside the tank will rise and the throttling valve 97 will be closed. The pressurized air from tank 17 is sent back to turbine 50 for acceleration or to move the vehicle by opening the throttle valve 97. The valve 96 is open all the time except when the vehicle is off and the engine is not running.

Figure 22:
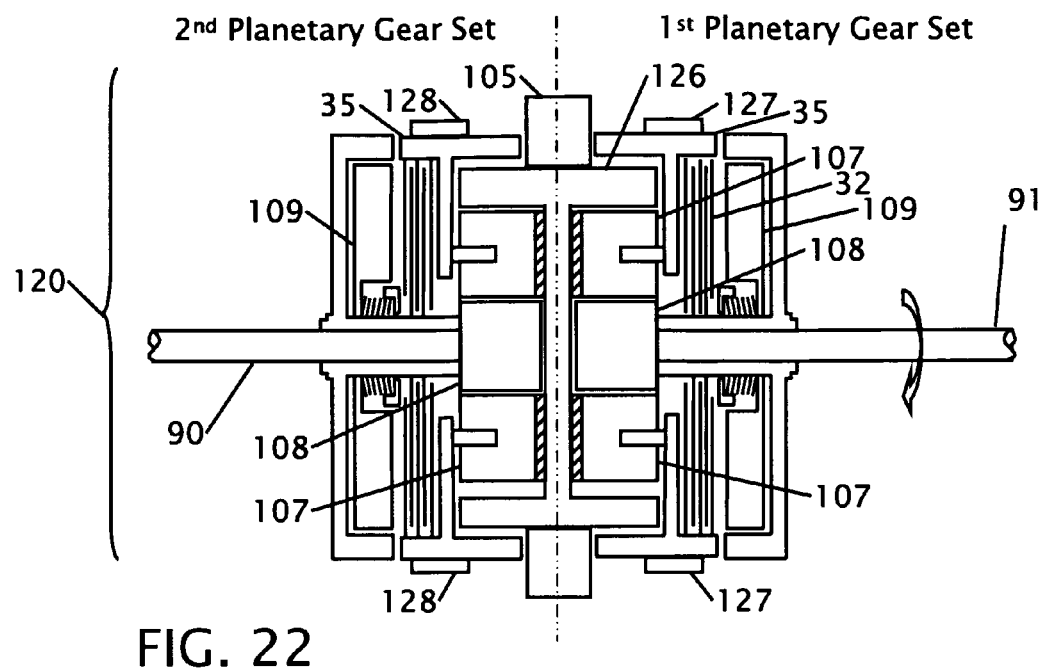
FIG. 22 shows a side cross sectional view of two planetary gear sets.

FIGS. 12, 13, 14 and 15 show a ninth and tenth preferred embodiments of the energy recovery system from the braking system 59 that includes a storage tank (II) 17 with a wire resistor 100 for external plug-in power and tow planetary gear sets 120 from FIG. 22. The first gear set is used for driving mode and the second gear sets for turbine 50 or for the multi turbine in the turbo transmission. If the second gear is set to the forward mode the turbine will act as a motor. If the second gear is set in the reverse mode the turbines will act as compressors. When the brake pedal is depressed the system will operate in braking mode where the second gear set will be in reverse and the valve 79 will be opened and the throttling valve 97 will be closed. The high pressure air from the compressor 49 and from the multiple compressors 50 will be sent to the storage tank (II). In acceleration mode the pressurized air from the storage tank (II) 17 is sent back to turbine 50 for acceleration or to mode the vehicle by changing the second gear set to forward mode, by closing the valve 79 and opening the throttling valve with the gas pedal.

FIG. 16 shows a system power curve for the Turbo-Transmission. The left vertical axis 71 is head in ft for a pump. The right vertical axis 73 is Torque in lb-ft for turbines on an output shaft. The upper horizontal axis 70 is N for the speed for a turbine in Revolutions per Minute (RPM). The bottom horizontal axis 72 is Q for Gallons per Minute (GPM) for a pump or turbine. Solid curved lines 74 represent system curves for a pump at different N, RPM(s). Dashed curved lines 75 represent system curves for turbines. From these curves the $1^{st}$ Gear curve 76 shows the first gear, Turbine 1 (T1)+Turbine 2 (T2)+Turbine 3 (T3) in operation. The curve of $2^{nd}$ Gear 77 shows the second gear, Turbine 1+Turbine 2 in operation. The curve of $3^{rd}$ Gear 78 shows the third gear, Turbine 1 in operation. The turbines and gears are described in more detail in FIGS. 17A-17D.

FIG. 17A-17D shows a three speed hybrid Turbo-Transmission and the air flow through turbines. The chart shown in FIG. 13D identifies the activation of the three solenoids to allow flow through the three turbines. The solenoids are designated as ON or OFF and their activation or de-activation allows or prevents flow from the pumps 48, 49 through the turbines 51-53. When any solenoid valve is on (closed) no flow will exist to the solenoid valve and the valve is OFF (open) flow will be allowed to pass though the valve. FIG. 13A represents a third gear where solenoid 1 is OFF and 2 and 3 are ON. Input shaft 26 turns pumps 48, 49 that supplies output flow 25 through turbine (T1) 51. Because solenoids 2 and 3 are ON no flow is made through turbines (T2) 52 or (T3) 53. Roller clutches in these turbines allow the turbine to free spin on the output shaft 90. FIG. 13D represents second gear where solenoid 2 is OFF and solenoids 1 and 3 are ON. Input shaft 26 turns pump 48, 49 that supplies output flow 25 through turbine (T1) 51 and turbine (T)2 52. Because solenoid 2 is OFF no flow is made through turbine or (T3) 53. Roller clutch in this turbine allow the turbine to free spin on the output shaft 90. FIG. 13C represents first gear where solenoid 3 is OFF and solenoids 1 and 2 are ON. Input shaft 26 turns pumps 48, 49 that supplies output flow 25 through turbines (T1) 51, (T2) 52 and (T3) 53 that turn the output shaft 90. The exhaust gas 24 from the turbines where it is release to the atmosphere.

Figure 18:
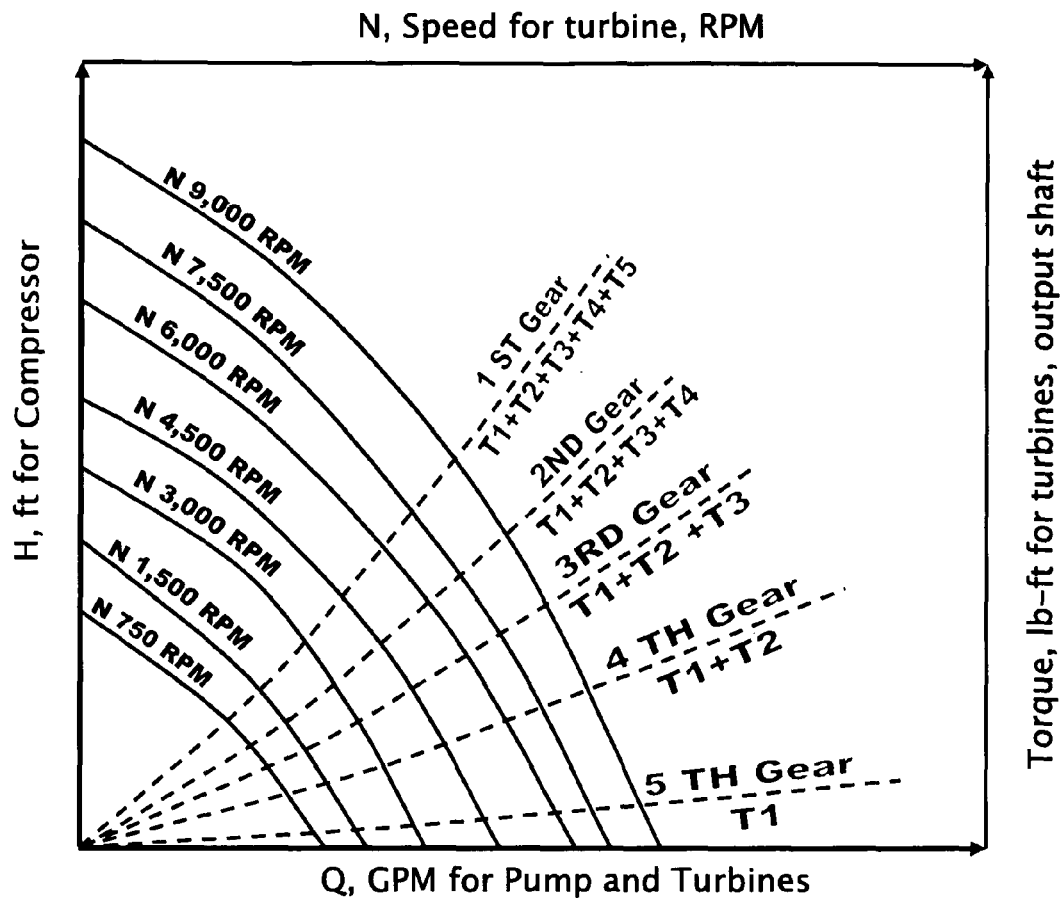
FIG. 18 shows a system curve for a five speed turbo-transmission.

FIG. 18 shows a system curve for a five speed hybrid turbo transmission. The transmission shown in this figure is similar to the three speed transmission that is shown and described in FIG. 16.

Figure 19:
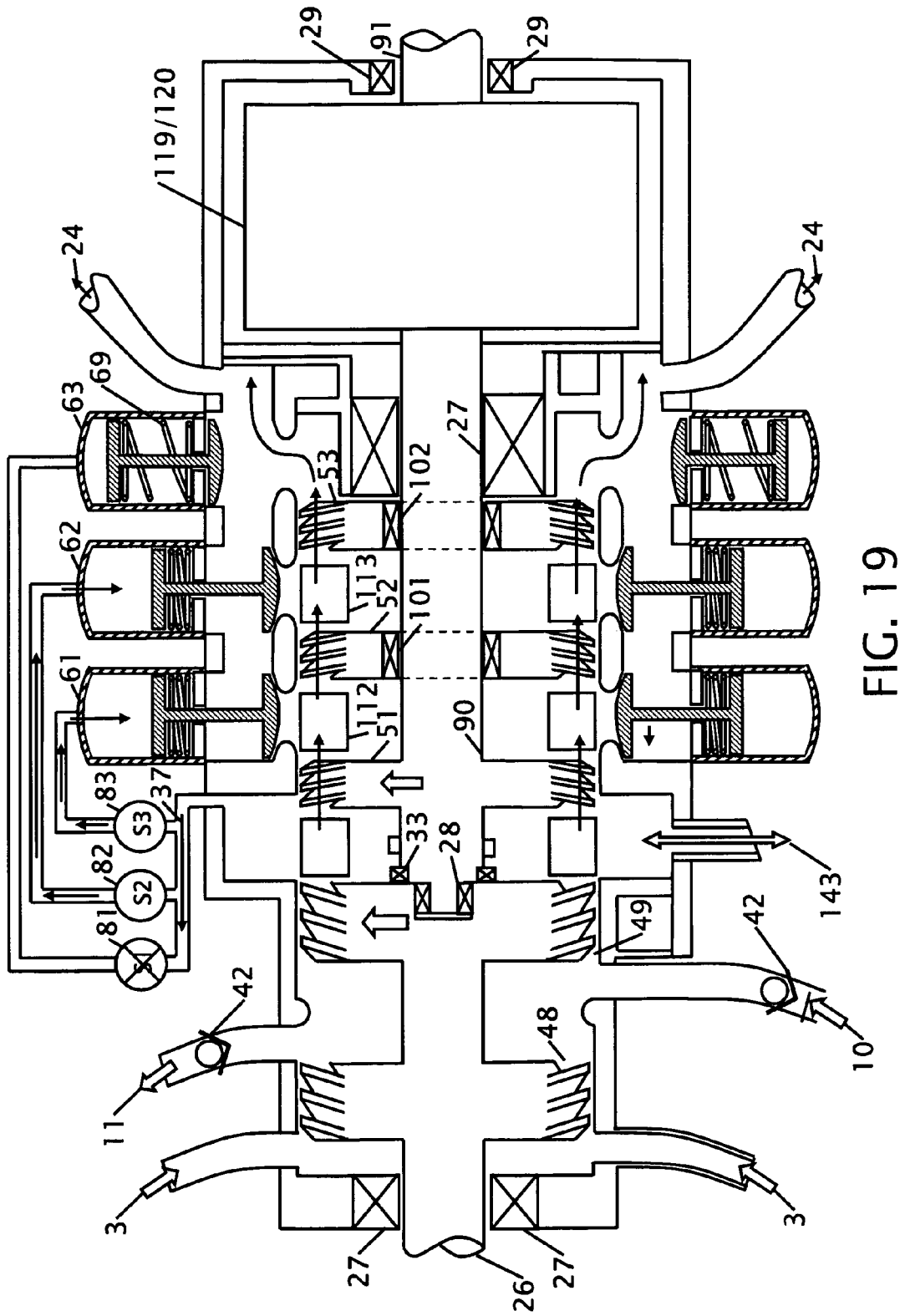
FIG. 19 shows a side cross sectional view of a three speed turbo-transmission.
Figure 20:
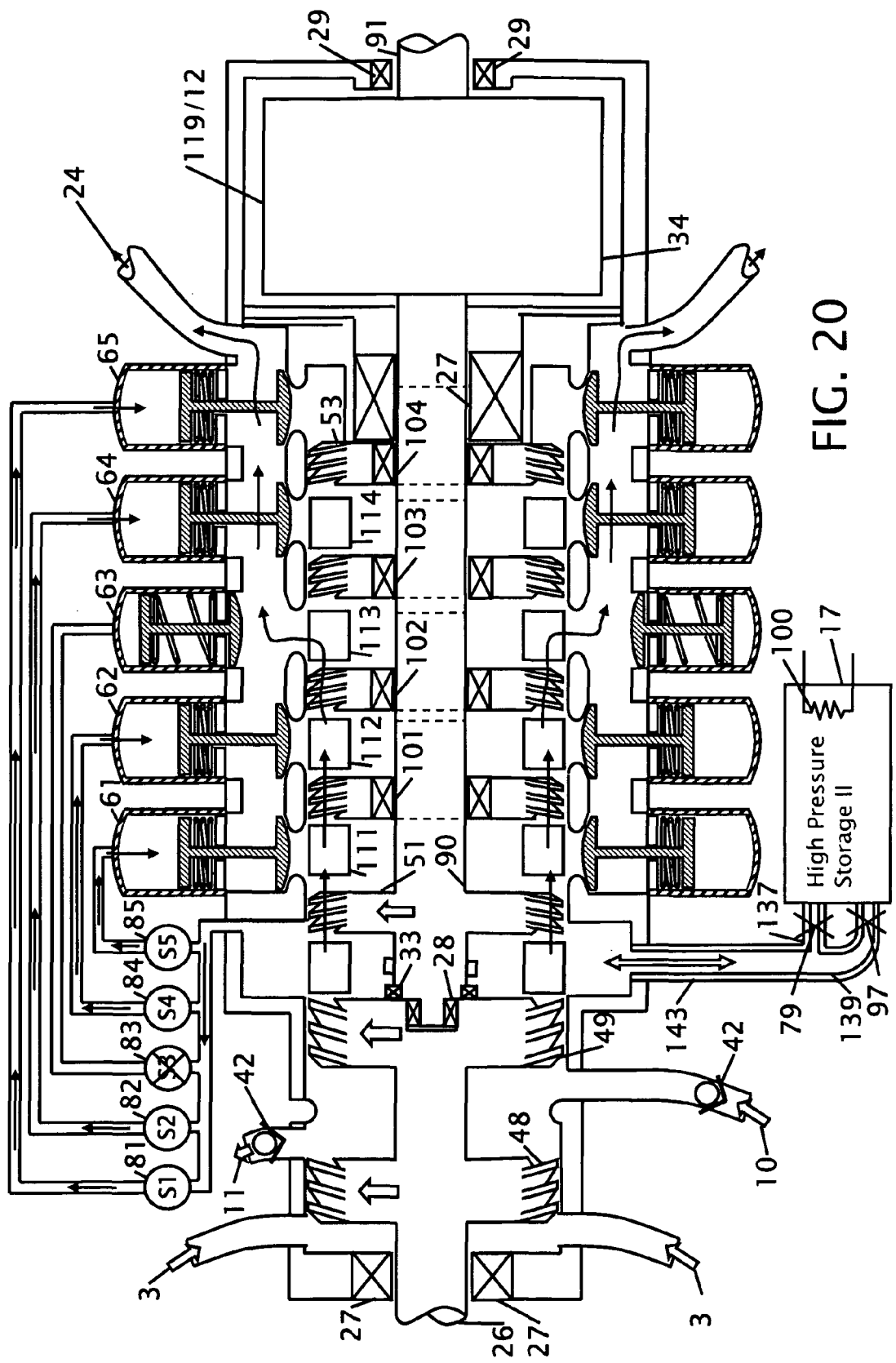
FIG. 20 shows a side cross sectional view of a five speed turbo-transmission.

The turbo transmissions shown in FIGS. 19, 20, are similar to the turbo-transmission shown in the inventor's pending application Ser. Nos. 12/145,469 and 12/421,286 with the addition of air line 3 from the cooling system, air compressor line 11 after compressor (I) enters into the engine through a storage tank and exhaust line 10 from engine. Another difference is that the air after the turbines exhausts out the end of the transmission. Air after the compressor (III) can pass 143 to and from a storage tank (II).

FIG. 19 shows a side cross sectional view of a three speed Turbo-Transmission. The turbo-transmission is essentially round and components shown on the top of this figure are also shown on the bottom of this figure. A brief look at FIGS. 19 and 20 show a cross section view of three sets of valves around the turbo-transmission and each of the three sets has eight valves it is contemplated that more or less than eight valves can be used. Rotational bearings 27, 28 and 29 support the various input 26 and output 90 shafts as the power is transmitted to the input shaft 26 through the pumps to turbo-transmission to the output shafts 90 and 91. One or more trust bearings 33 maintain the turbines in position from the thrust being exerted on them. In operation input shaft 26 is turned by a motor or the like. When input shaft 26 is turned it will turn pumps 48, 49. A portion of the flow 37 will be used to operate solenoids 81-83 that control valves 61-63 that allow one or more of the turbines 51-53 to turn. Valves 61-63 are maintained in the open position with spring(s) 69.

The output flow 25 from pumps 48, 49 will push against first turbine 51 and will turn the turbine on. Output flow from turbine 51 will push through the nozzle 112 to redirect flow to turbine 52 and will turn the turbine on. The flow then goes through nozzle 113 to redirect the flow to another turbine 53 and turn the turbine on and then the flow 24 will release the air to the atmosphere. The pressure after the pump 49 will be larger than the pressure at the nozzle 112. The pressure through each successive turbine will drop gradually as the fluid flows though each turbine. Specifically the pressure at nozzle 112 will be greater than the pressure at nozzle 113 and the pressure at nozzle 113 will be larger than the pressure after turbine 53.

In this figure, flow 37 is shown passing through only valves 82 and 83 because valve 81 is closed. Flow through the solenoids 82 and 83 then flows into valves 61 and 62 that block flow through the opening. The output flow will push through nozzles 112 and 113 to turn their respective turbines. Turbines 52 and 53 are connected to the shaft with one-way clutches 101 and 102 the turn the shaft and also allow the turbines 52 and 53 to free spin on the shaft when flow, or insufficient flow, is not running though the turbines. A planetary gear set(s) 119/120 is located after the turbo-transmission on the output shaft 91 for the driving mode. The parking gear and the speed sensor is located on the output shaft 91.

FIG. 20 shows a side cross sectional view of a five speed turbo-transmission. The transmission shown in this figure is similar to the transmission shown in FIG. 19. The major differences are that this turbo transmission has five turbines to simulate a five speed transmission. Output flow 25 from the pump 49 is fed to the solenoids 81-85 and the turbines. In this figure solenoid 83 is off therefore the valve 63 is open. When this valve 63 is open flow 24 will be released to the atmosphere. The remaining valves 61, 62, 64 and 65 will be closed and no flow will go through the opening to output flow 24. In this figure the turbines are connected to the shaft 90 with one-way clutches 101-104. Flow to and through a turbine will turn on the turbine and engage the clutch(s).

Figure 21:
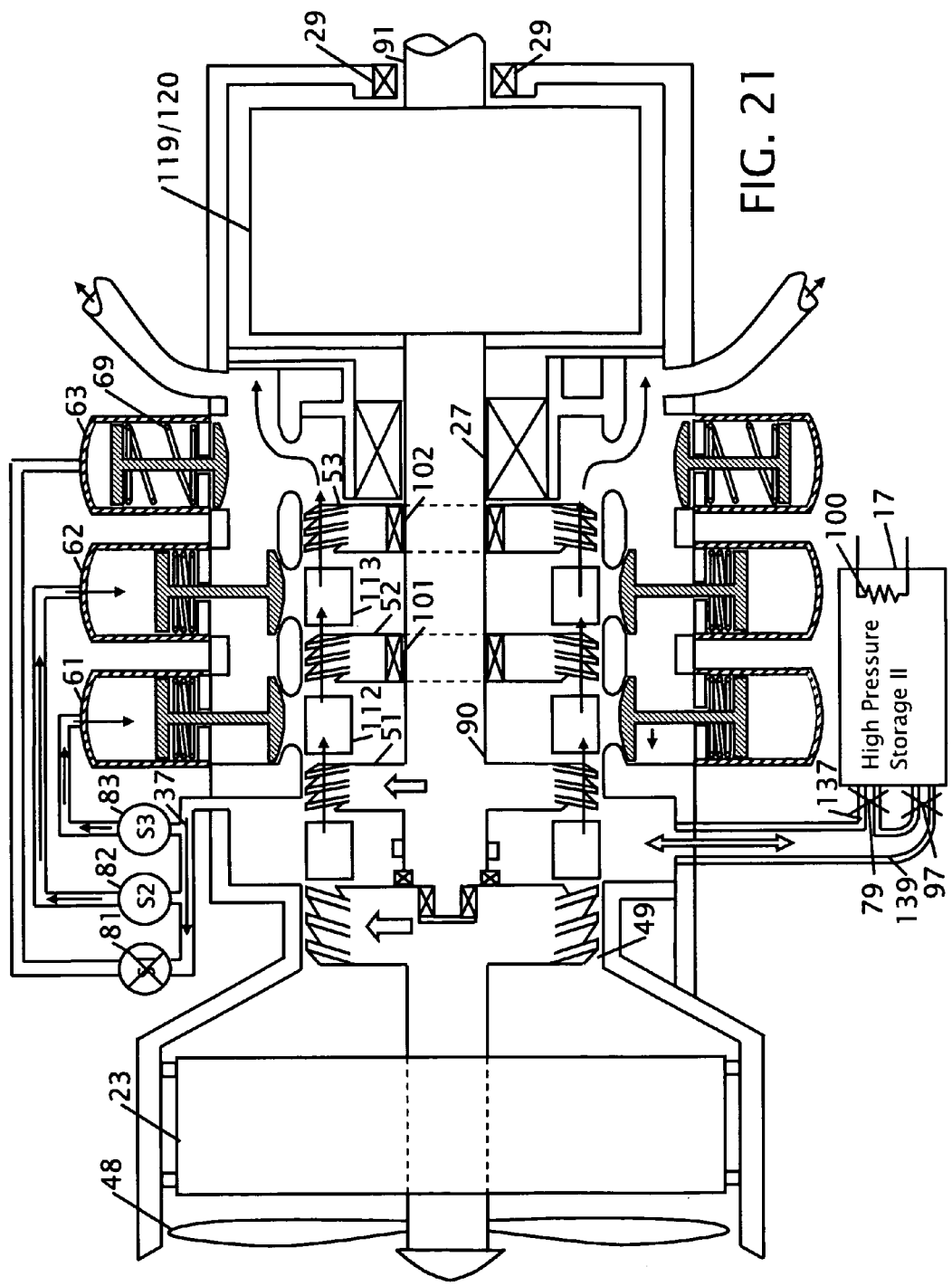
FIG. 21 shows a side cross sectional view of a three speed turbo-transmission with ram air input compressor and a radial engine.

FIG. 21 shows a side cross sectional view of a three speed hybrid turbo-transmission that is similar to the transmission shown and described in FIG. 19 except the air ram enters the first compressor (I) 48 before the radial engine 23 and the compressed air goes through air cooling system of the radial engine 23 to compressor (I) 49 after being mixed with exhaust gas from the engine. The engine 23 disclosed in the inventor's prior application Ser. No. 12/228,203.

FIG. 22 shows a cross-sectional view of two planetary gear sets 120. The first gear set is used in driving mode where it locks the multi-disc clutch 32. In reverse mode, braking band 127 is locked. For neutral, the multi-disc clutch 32 and the brake band 127 is free and the system has a piston 109 that pushes against the multi-disc clutch 32, planetary gear carrier 35, planetary gear 107, sun gear 108 and common ring gear 126. The ring gear 126 has a one-way clutch to let the ring gear 105 turn on only one direction. The second planetary gear is used either for forward mode where the turbines act as motors by locking the multi-disc clutch 32. For reverse mode, the turbines act as pumps when the brakes are applied. The reverse mode is performed by locking the brake band 128 and releasing the disc clutch 32.

Figure 23:
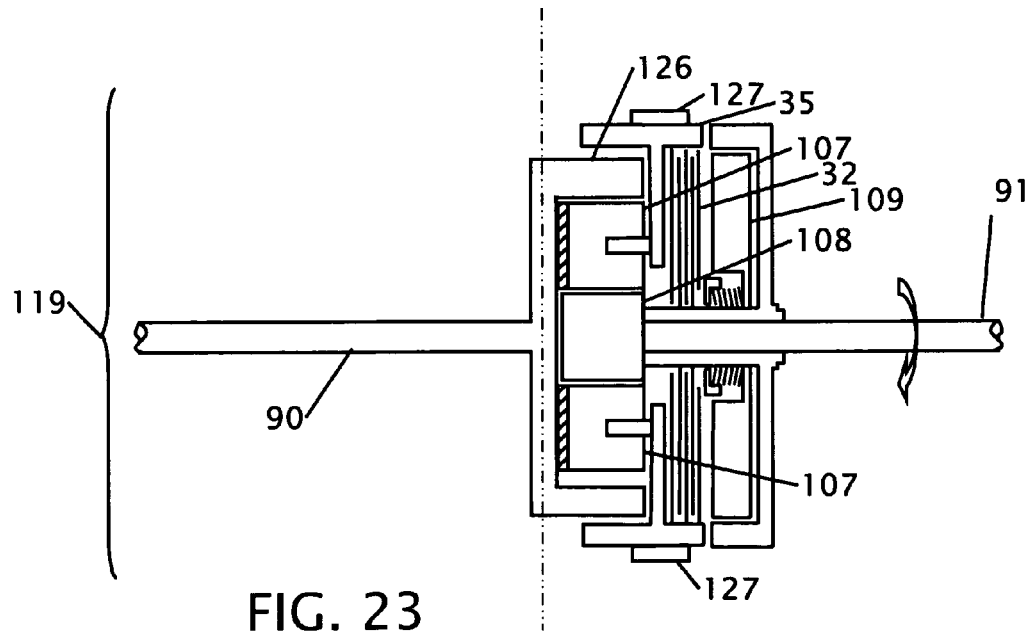
FIG. 23 shows a side cross sectional view of one planetary gear set.

FIG. 23 shows a cross sectional view of one planetary gear set 119 and is similar to the first gear shown and disclosed in FIG. 22.

Figure 24:
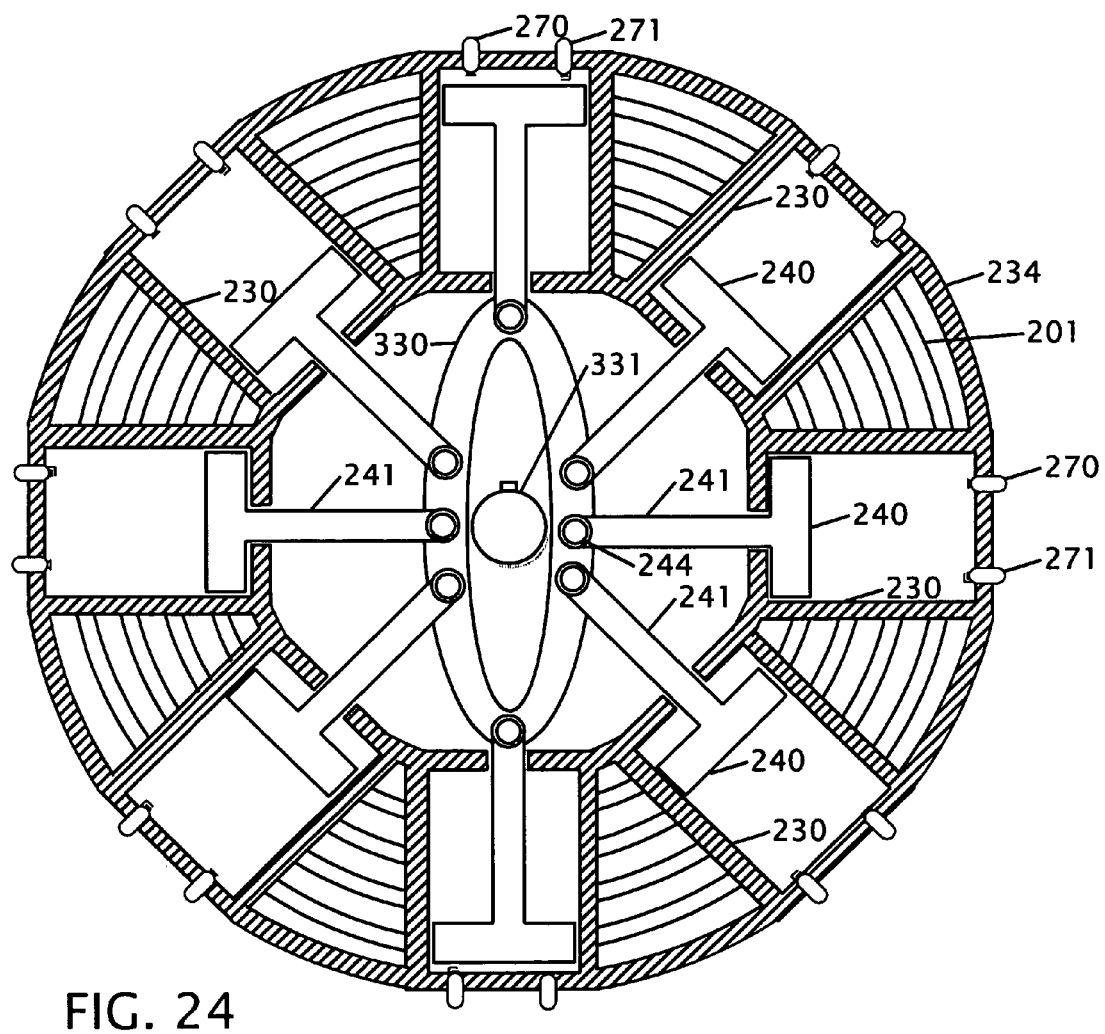
FIG. 24 shows a simplified cross sectional view of the engine with eight cylinders on one elliptical crank with cooling fins.

FIG. 24 shows a simplified cross sectional view of the radial engine with eight cylinders on one elliptical crank with cooling fins. The components of these cylinders is similar to previous described in the inventor's pending application Ser. No. 12/228,203 with the cylinder(s) 230 having an internal piston 240 connected to a fixed piston arm through a bearing 244 to an elliptical crank 330 that turns drive shaft 331. A fuel injector 270 and a spark plug 271 exist on the top or head of the cylinder. Each piston 240 has a piston arm 41 that connects through a bearing onto the elliptical crank 330 that turns the drive shaft 331. The cylinders could be various types of mixed cylinders selected between engine cylinders and compression cylinders based upon desire, need or use. Cooling vanes 201 are placed between the cylinders to provide cooling of the engine.

Figure 25:
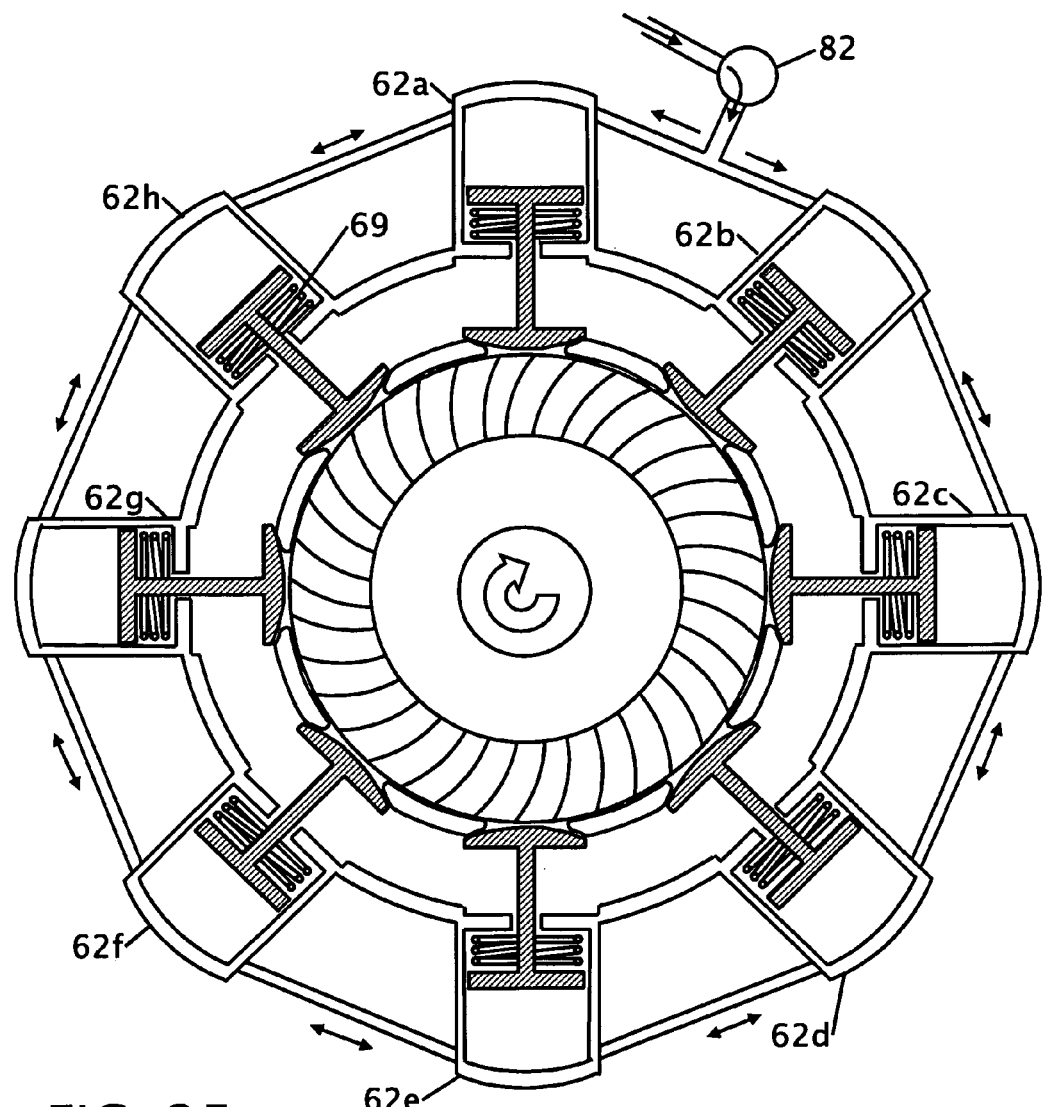
FIG. 25 shows a front cross sectional view of one turbine of a turbo-transmission with the valves closed.
Figure 26:
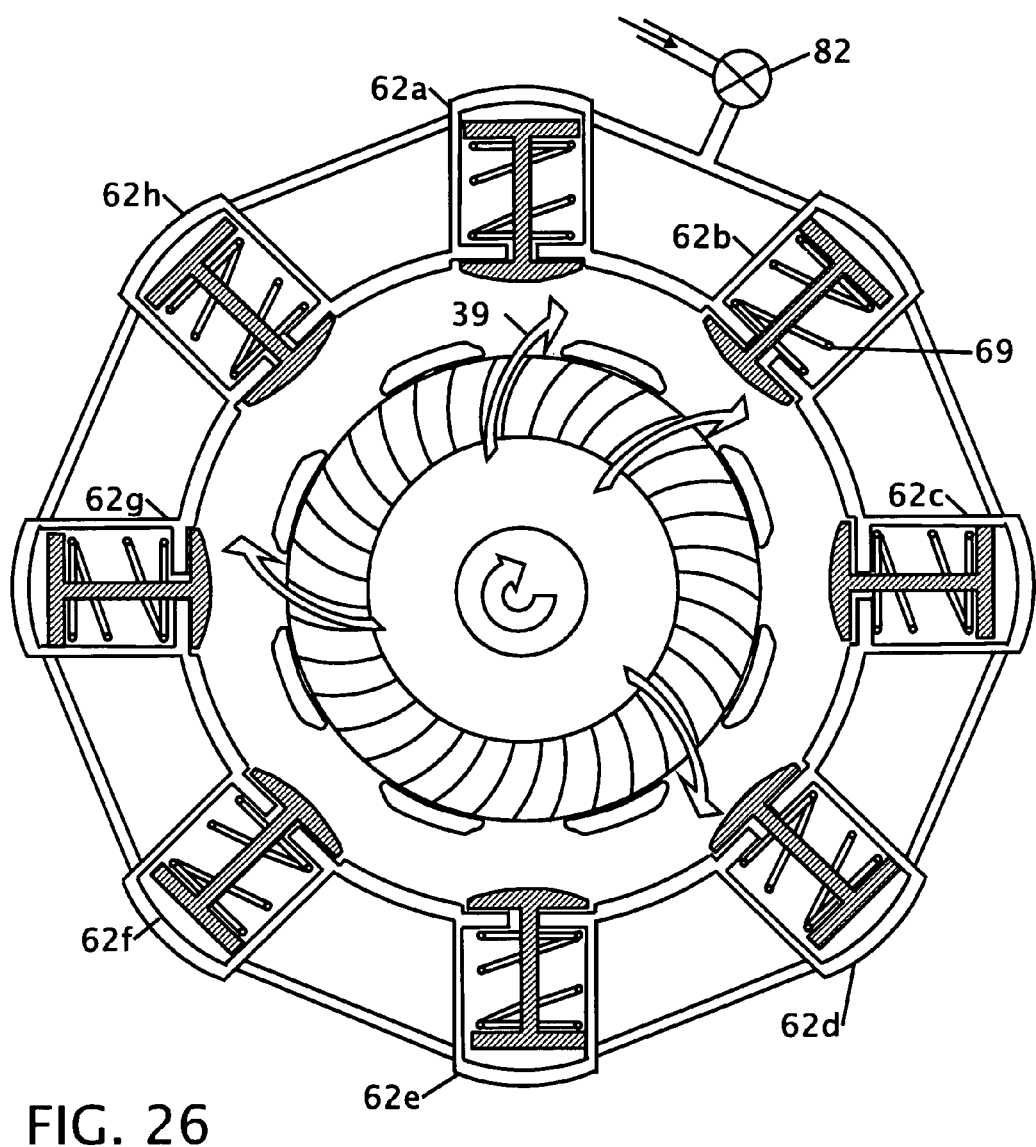
FIG. 26 shows a front cross sectional view of one turbine of a turbo-transmission with the valves open.

FIG. 25 shows a front cross sectional view of one turbine of a turbo-transmission with the valves closed. FIG. 26 shows a front cross sectional view of one turbine of a Turbo-Transmission with the valves open. While it is shown with eight valves 62a-62h existing around the turbo-transmission it is contemplated that more or less than eight valves can be used. In FIG. 25, the solenoid, 82 is open and flow enters all the valves 62a-62h, whereby pushing the valves closed. In this orientation flow will be blocked from exiting the opening after turbine 52 (not shown). In FIG. 26, the solenoid, 82 is closed and flow is blocked from all the valves 62a-62h, whereby allowing flow 39 through the opening after turbine 52 (not shown). Note that the spring(s) 69 maintains the valve(s) open in FIG. 26.

Figure 27:
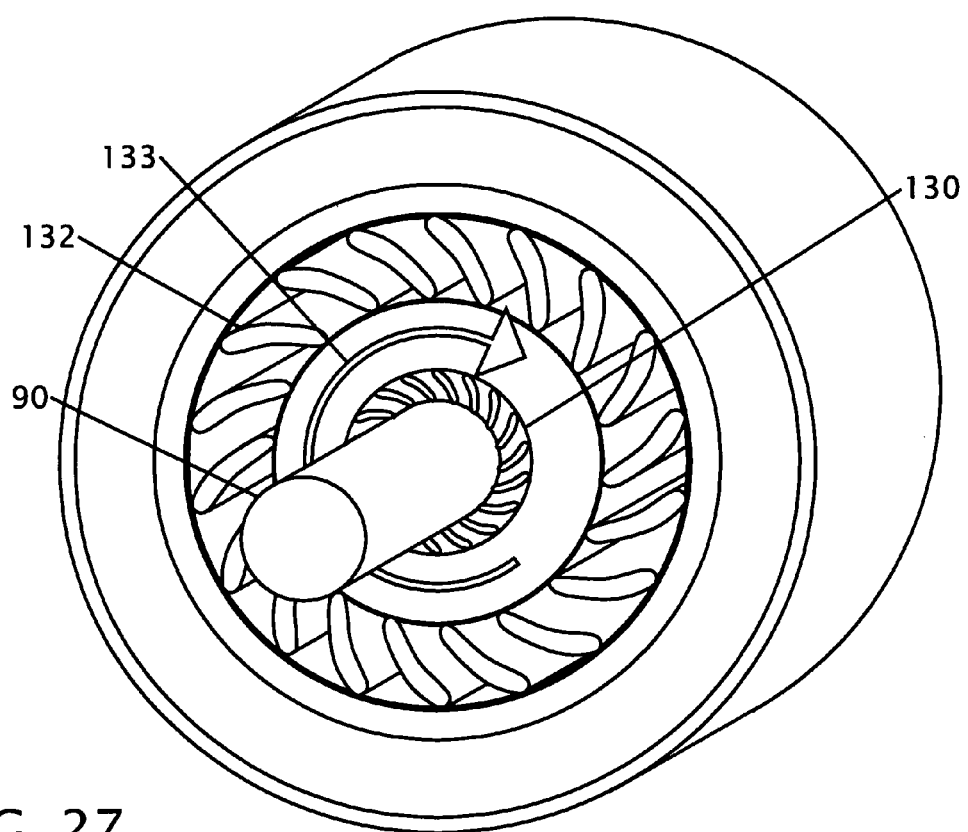
FIG. 27 shows a partial isometric view of one-way overrunning clutches or roller clutches that connect the speed turbines to the driven shaft.

FIG. 27 shows a partial isometric view of one-way over-running clutches or roller clutches that connect the speed turbines to the driven shaft. This figure shows one contemplated embodiment of a one way clutch using a plurality or dogs or sprags 130 connected around a shaft 90. When the turbine 132 turns in one direction the dogs or sprags 130 grip onto the shaft 90 to turn the shaft. When the turbine 132 stops or turns 133 in the opposite direction, the dogs or sprags release the shaft and allows the turbine to free spin on the shaft 90. While dogs or sprags are shown and described a number of other one-way clutches or bearing are contemplated that perform equivalently.

Figure 28:
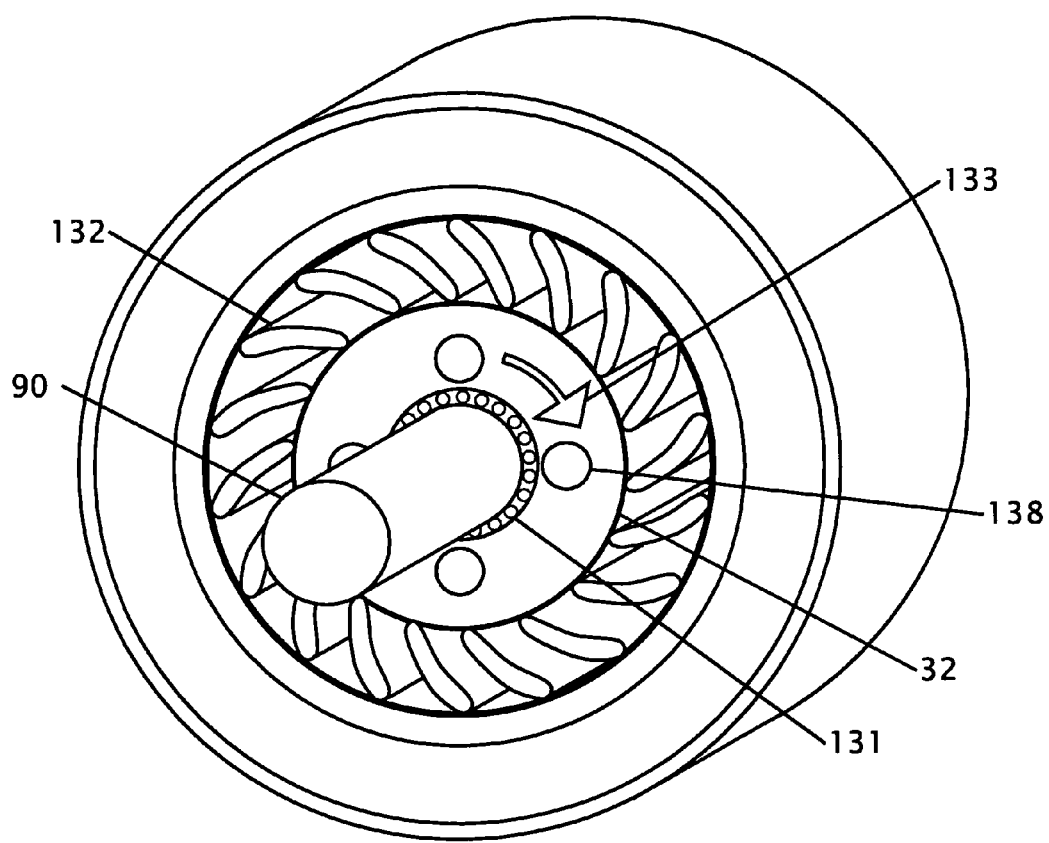
FIG. 28 shows a partial isometric view of a multiple disc clutch that connects the speed turbines to the driven shaft.
Figure 29:
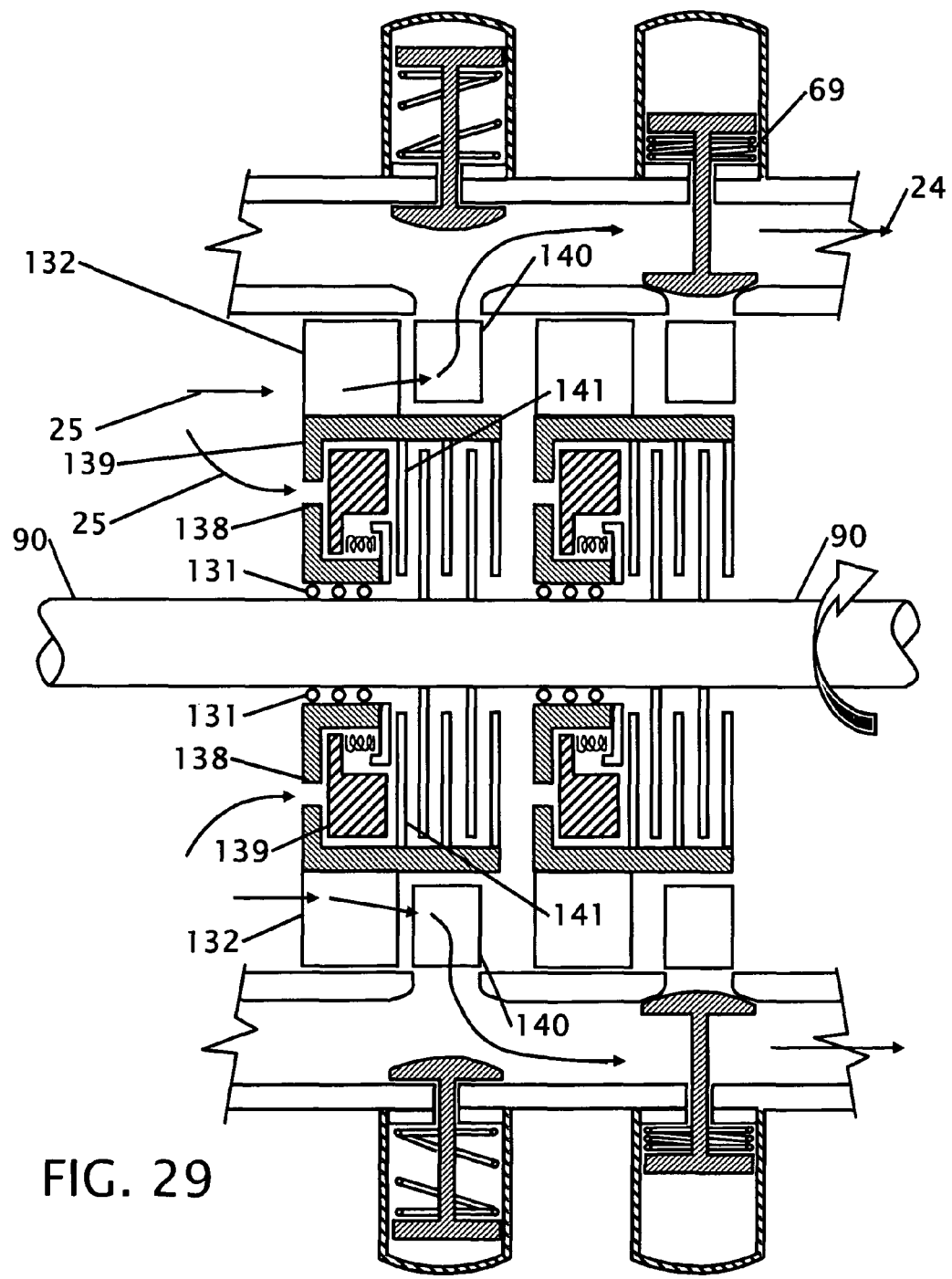
FIG. 29 shows a side cross sectional view of a multiple-disk clutch used in the Turbo-Transmission.

FIG. 28 shows a partial isometric view of a multiple disc clutch that connects the speed turbines to the driven shaft. FIG. 29 shows a side cross-sectionals view of a multiple-disk clutch used in the turbo-transmission. FIG. 28 shows a shaft 90 connected to a multi-disc clutch plate 32 through bearing 131. The multi-disc clutch pack 32 is shown with more detail in FIG. 23. This configuration uses the pressure of the output flow 25, which comes from the pump, to go through opening 138 to push piston 139 and lock the disk clutch 141. The moving clutch plate has the turbine blades 132 that provide the rotational motion 133 on the output shaft 90. In addition to the output flow 25 entering the opening 138 flow will also move through the nozzle(s) 140.

FIG. 29 shows a partial cross-sectional view of the turbine with a multiple-disc clutch connected to output shaft 90 with bearing 131. When the differential pressure before or after the turbine is sufficient to turn the turbine and lock the multi-disc clutch then the power will transfer to output shaft 90. The pressure 25 will turn the turbine 132 and push through opening 138 where it will push piston 139 against the disk clutch 141 and lock the turbine to output shaft 90.

Thus, specific embodiments of a pneumatic hybrid turbo-transmission have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A pneumatic hybrid turbo transmission comprising:
   an outer housing defining an interior region containing gas or air;
   an input shaft being coupled to a power source to receive energy there from;
   an input shaft being couple to a pump(s) to transfer energy from said power source into the gas or air and then to a turbine or a multi-stage turbine;
   a first turbine positioned in front of said pump(s) and is fixed to an output shaft;
   at least a second turbine located in series after said first turbine rotationally secured to said output shaft with a one-way overrunning clutch or multiple-disc clutch;
   a plurality of valves located after each turbine that are opened to discharge air or gas after each turbine or closed to allow flow to said second or subsequent turbine(s);
   said plurality of valves that are opened or closed under control of corresponding solenoids to change a drive ratio between said input and said output shaft wherein;
   all one-way overrunning clutches will be locked in the same direction of said first turbine and will be free to rotate in an opposing direction without appreciable drag on said output shaft, and
   said turbines will transfer power when the differential pressure before and after said turbines is sufficient to turn said turbines and lock said one-way overrunning clutch or multi-disc clutch and to transfer power to said output shaft.

2. The pneumatic hybrid turbo transmission according to claim 1 wherein said power source is an internal combustion engine, and additional power is recovered from at least one of a cooling system, an exhaust system, a ram pressure system and a braking system.

3. The pneumatic hybrid turbo transmission according to claim 2 wherein said ram pressure system is energy recovered from aerodynamic ram air that enters through an air cooling system radiator where it gains thermal heat energy and enters into a compressor through a hood around a radiator in a vehicle having an enlarged front opening wherein;
   said energy that is recovered increases as a function of vehicle speed.

4. The pneumatic hybrid turbo transmission according to claim 2 wherein a first compressor produces high pressure air and at least some of said high pressure air is redirected to an inter-cooling storage tank I then to said internal combustion engine to supercharge intake air into said internal combustion engine, and at least some of said high pressure air is mixed with exhaust from said exhaust from said internal combustion engine and directed to a second compressor to produce higher pressure mixed air that is used by said turbine(s), whereby said mixed air produces low pollution.

5. The pneumatic hybrid turbo transmission according to claim 4 wherein recovered energy from said braking system comprises;
   a storage tank II for storing high pressure air;
   a regenerative braking system whereby braking converts kinetic energy from slowing a vehicle into pressurized air that is stored in said storage tank II with a pressure relief valve for safety;
   said kinetic energy is converted to turn a compressor III located after a transmission and pressurize air that is initially compressed from a compressor II to create a higher pressure air in said storage tank II through a pipe line having a valve that is operated by a brake pedal or by a vehicle control unit of said vehicle;
   high pressure from said storage tank II is transferred to a first turbine engine through a pipe having a throttling valve operated by a gas pedal or by a vehicle control unit of said vehicle;
   said vehicle operates as a fully or partially pneumatic vehicle as needed, and
   said electrical and hydraulic control coordinates between brake and vehicle control of said vehicle based upon action of a user.

6. The pneumatic hybrid turbo transmission according to claim 4 wherein recovered energy from said braking system comprises;
   a storage tank II for storing high pressure air with a pressure relief valve for safety;
   a regenerative braking system whereby braking converts kinetic energy from slowing a vehicle into electrical energy using an electric generator which is uses to power a resistance wire to heat air within said storage tank II to increase the air pressure within said storage tank II;
   high pressure from said storage tank II is transferred to a first turbine engine through a pipe having a throttling valve operated by a gas pedal or by a vehicle control unit of said vehicle;
   said vehicle operates as a fully or partially pneumatic vehicle as needed, and
   said electrical and hydraulic control coordinates between brake, electric generator and vehicle control of said vehicle based upon action of a user.

7. The pneumatic hybrid turbo transmission according to claim 4 wherein recovered energy from said braking system comprises;

a first planetary gear set, sun gear, carrier, ring gear that provides reverse, neutral, and forward operation of a vehicle;

a second planetary gear set, sun gear, carrier and ring gear located between last turbine and said first planetary gear;

wherein a turbine shaft located before said second planetary gear set will turn in the same direction of said output shaft located after said second planetary gear set, therefore all turbines will act as a motor;

when brakes are applied said turbine shaft will be in a reverse rotation by said second planetary gear set, therefore all of said turbines will act as pumps that will pump low pressure air to a storage tank II through a conduit having a valve that is opened when said brakes are applied;

a regenerative braking system whereby braking converts kinetic energy from slowing a vehicle into pressurized air that is stored in said storage tank II with a pressure relief valve for safety;

said kinetic energy is converted to turn said turbines in reverse rotation that are located in a transmission and pressurized air from exhaust air to a higher pressure air in said storage tank II through a pipe having a valve that is opened by a braking pedal or by a vehicle control unit of said vehicle;

high pressure from said storage tank II is transferred to said first turbine through a pipe having a throttling valve that is operated by a gas pedal or by a vehicle control unit for said vehicle for acceleration or to move said vehicle;

said vehicle operates as a fully or partially pneumatic vehicle as needed and, said electrical and hydraulic control coordinated between brake and vehicle control of said vehicle based upon action of a user.

8. The pneumatic hybrid turbo transmission according to claim 4 that further includes an electrical connection to an external power supply and or batteries on said vehicle that connects to at least one resistance wire located within a storage tank II that will heat air in said storage tank II to increase air pressure within said storage tank II for use to start or propel said vehicle.

9. The pneumatic hybrid turbo transmission according to claim 2 wherein recovered energy from said braking system comprises;

a storage tank II for storing high pressure air with a pressure relief valve in said storage tank II for safety;

a regenerative braking system whereby braking converts kinetic energy from slowing a vehicle into pressurized air that is stored in said storage tank II;

said kinetic energy is converted from operation of a compressor/turbo located after a transmission to pressurize air that is initially compressed from said compressor II to create a higher pressure air for storage in said storage tank II;

air from within said storage tank II that is passed through said compressor/turbo unit is used to generate energy that starts and or accelerates said vehicle as a fully or partially pneumatic vehicle as needed.

10. The pneumatic hybrid turbo transmission according to claim 9 wherein said compressor/turbo unit operates as a compressor from braking said vehicle, turbine generates power to start or move said vehicle;

said compressor/turbo unit is selected from a group of centrifugal type, displacement type, hydraulic pump type or equivalent;

said compressor/turbo unit is connected to said vehicle with a planetary gear set, sun gear and carrier ring to provide forward operation of said compressor, a reverse operation of said turbine and a neutral operation when said unit is not engaged or used for any type of engagement, and said electrical and hydraulic control coordinates between brake and vehicle control of said vehicle based upon action of a user.

11. The pneumatic hybrid turbo transmission according to claim 1 wherein a nozzle is located between each turbine to redirect the gas to other turbines or to an open valve.

12. The pneumatic hybrid turbo transmission according to claim 1 wherein all said turbines before said open valves will be in driven rotation and all turbines after the last open set of said valves will be in free rotation on said output shaft because no gas is flowing through the remaining turbines.

13. The pneumatic hybrid turbo transmission according to claim 1 wherein each said turbine has a different blade size and or angle to create a different gear ratio.

14. The pneumatic hybrid turbo transmission according to claim 1 wherein all of said solenoids are operable manually to act as a manual transmission or by a transmission control module that acts as an automatic transmission.

15. The pneumatic hybrid turbo transmission according to claim 1 wherein all said valves operate by pressurized gas that is created by a last compressor through said solenoid.

16. The pneumatic hybrid turbo transmission according to claim 1 that further includes a planetary gear set, sun gear, carrier, ring gear that provides reverse, neutral, and forward operations.

17. The pneumatic hybrid turbo transmission according to claim 1 wherein said transmission uses two separate controllers where one controller controls the turbine operation and a second controller controls the vehicle operation for reverse, neutral and forward.

18. The pneumatic hybrid turbo transmission according to claim 1 wherein the number of turbines in said transmission will correspond to the number of gears in the transmission having five of said turbines and five of said solenoids wherein operation of a first turbine corresponds to a fifth gear or overdrive gear, operation of a first and second turbine corresponds to a fourth gear operation of a first, second and third turbine corresponds to a third gear, operation of a first, second, third and fourth turbine corresponds to a second gear, operation and operation of a first, second, third, fourth and fifth turbine corresponds to a first gear.

19. The pneumatic hybrid turbo transmission according to claim 1 wherein said turbine is connected to a one-way overrunning clutch whereby said turbine transfers power when differential pressure before and after said turbine is sufficient to run said one-way overrunning clutch into engagement with said output shaft.

20. The pneumatic hybrid turbo transmission according to claim 1 wherein said turbine is connected to a multi-disc clutch whereby said turbine transfers power when differential pressure before and after said turbine is sufficient to run said multi-disc clutch into engagement with said output shaft or uses fluid pressure on a piston in said multi-disc clutch for engagement.

21. The pneumatic hybrid turbo transmission according to claim 1 wherein said solenoids open pistons that allow and prevent gas through one or more of said turbines.

22. The pneumatic hybrid turbo transmission according to claim 1 wherein said power source is a radial configured internal combustion engine configured with fluid and or an air cooling system whereby;

said at least one compressor(s) is located in front of said radial configured internal combustion engine;

at least a second compressor(s) is located behind said radial configured internal combustion engine;

said compressor operates from ram air entering into a front of said compressor where at least a portion of compressed ram air will enter into said radial configured internal combustion engine and at least a portion of said compressed ram air will pass though said air cooling system;

warmed air that exits said air cooling system is then mixed with exhaust gas from said radial configured internal combustion engine where it is passed into said at least a second compressor(s).

\* \* \* \* \*